(12) United States Patent
Matsunaga

(10) Patent No.: US 8,218,548 B2
(45) Date of Patent: Jul. 10, 2012

(54) INFORMATION PROCESSING APPARATUS, METHOD, AND PROGRAM

(75) Inventor: Osamu Matsunaga, Kanagawa (JP)

(73) Assignee: Sony Corporation, Tokyo (JP)

(*) Notice: Subject to any disclaimer, the term of this patent is extended or adjusted under 35 U.S.C. 154(b) by 779 days.

(21) Appl. No.: 11/627,098

(22) Filed: Jan. 25, 2007

(65) Prior Publication Data

US 2007/0171820 A1    Jul. 26, 2007

(30) Foreign Application Priority Data

Jan. 26, 2006    (JP) ................... 2006-017205

(51) Int. Cl.
*H04L 12/56*    (2006.01)
(52) U.S. Cl. .................................... 370/394
(58) Field of Classification Search .......... 370/503, 370/229–231, 235, 236, 241, 252, 310, 310.1, 370/351, 389, 392, 394, 901–903, 905, 912
See application file for complete search history.

(56) References Cited

U.S. PATENT DOCUMENTS

| | | | |
|---|---|---|---|
| 6,275,471 B1* | 8/2001 | Bushmitch et al. | 370/248 |
| 2003/0063573 A1* | 4/2003 | Vandermersch | 370/260 |
| 2005/0141559 A1* | 6/2005 | Choi et al. | 370/469 |
| 2005/0160346 A1* | 7/2005 | Yamane | 714/776 |
| 2006/0088030 A1* | 4/2006 | Beeson et al. | 370/389 |

FOREIGN PATENT DOCUMENTS

| | | |
|---|---|---|
| JP | 6-95678 | 11/1994 |
| JP | 10-32573 | 2/1998 |
| JP | 2000-151649 | 5/2000 |
| JP | 2000-332802 | 11/2000 |
| JP | 3385899 | 1/2003 |
| JP | 2003-204343 | 7/2003 |
| JP | 2003-235027 | 8/2003 |
| JP | 2004-282341 | 10/2004 |
| JP | 2004-343407 | 12/2004 |
| JP | 2005-253033 | 9/2005 |
| JP | 2005-354542 | 12/2005 |
| WO | WO 2005/045597 A2 | 5/2005 |

* cited by examiner

*Primary Examiner* — Derrick Ferris
*Assistant Examiner* — Omar Ghowrwal
(74) *Attorney, Agent, or Firm* — Oblon, Spivak, McClelland, Maier & Neustadt, L.L.P.

(57) ABSTRACT

The present invention provides an information processing apparatus which is a component of an information processing system in which real time data for which transmission and reception assurance within a predetermined period of time after every fixed period is necessary is communicated through an asynchronous network. The apparatus includes a generator and a transmission controller. The generator is configured to generate time synchronizing information, which is to be utilized upon setting of transmission and reception schedules of the real time data, as packets having a first region into which a sequence number which varies after every period of time corresponding to the fixed period is to be described. The transmission controller is configured to control the packets generated by the generator such that one packet is transmitted to the asynchronous network at each transmission timing after the fixed period.

17 Claims, 21 Drawing Sheets

INFORMATION PROCESSING APPARATUS, METHOD, AND PROGRAM

CROSS REFERENCES TO RELATED APPLICATIONS

The present invention contains subject matter related to Japanese Patent Application JP 2006-017205 filed in the Japanese Patent Office on Jan. 26, 2006, the entire contents of which being incorporated herein by reference.

BACKGROUND OF THE INVENTION

1. Field of the Invention

This invention relates to an information processing apparatus, method, and a program, and more particularly to an information processing apparatus, method, and a program by which data can be communicated.

2. Description of the Related Art

General communication through a LAN (Local Area Network) or the like assumes that particular data packets do not occupy a transmission line and data packets corresponding to a plurality of services can be transmitted at any time. Therefore, it should be taken into consideration for each service by what degree the packet loss or packet delay arising from collision between data packets during transmission of data packets can be permitted. Accordingly, although the packet loss or packet delay does not make a serious problem to transmission of data packets corresponding to services for which the real time performance is not necessary, it makes a serious problem to transmission of data packets corresponding to services for which the real time performance is necessary.

The real time performance signifies to satisfy a restrictive condition that a predetermined process is completed within a fixed period of time, that is, a temporal restriction.

Several methods have been proposed to solve the problem described above. One of such methods is disclosed, for example, in Japanese Patent No. 3385899 entitled "Real Time Communication Method" (hereinafter referred to as Patent Document 1). Another method is disclosed, for example, in Japanese Patent No. 1963910 entitled "Multimedia LAN System" (hereinafter referred to as Patent Document 2). According to the "Real Time Communication Method" of Patent Document 1, a data packet for which the real time performance is necessary is transmitted within a predetermined period of time which appears periodically. The real time performance is assured by calculating and setting the amount of data which can be transmitted within the predetermined period of time so that the data amount may be equal to or lower than a predetermined value. Meanwhile, according to the "Multimedia LAN System" of Patent Document 2, a synchronous control time slot, a synchronous transfer time slot, and an asynchronous transfer time slot common to an entire LAN system are provided, and the real time performance of data packets which are transmitted using the synchronous transfer time slot is assured.

On the other hand, in recent years, where a process is executed between and by different apparatus connected to a network, the real time performance is sometimes necessary not only for a process by the sender side but including a process by the receiver side. For example, an operation as to change over a plurality of image changeover apparatus so as to change over image signal outputs of them at a time in a particular image frame is controlled from a control apparatus through a network. In such a case, it is necessary not only for the control apparatus of the sender side to transmit a pertaining control data packet within a fixed period of time but also for the image changeover apparatus on the receiver side to receive the control data packet and execute a process based on the control data packet within the same fixed period of time.

It is to be noted that, in the following description, that the real time performance is necessary including processes not only by the sender side but also by the receiver side in this manner is hereinafter referred to also as demand for transmission and reception assurance within a predetermined period of time.

SUMMARY OF THE INVENTION

Indeed both of the methods disclosed in Patent Document 1 entitled "Real Time Communication Method" and Patent Document 2 entitled "Multimedia LAN System" assure a sufficient bandwidth for communication of data packets for which the real time performance is necessary. However, it is not assured that arrival of and a reception process for data packets are carried out within a fixed period of time. Accordingly, even if the methods described are merely adopted, it is difficult to satisfy the demand for transmission and reception assurance within a predetermined period of time.

Further, the same clock frequency can be used for data processes by the transmitting and receiving apparatus. However, if reference clock data is described in a packet to be transmitted to establish synchronism, it is difficult for both of the transmitting and receiving apparatus of the packet to individually execute data processes whose periods coincide with each other.

Therefore, it is preferable to provide an information processing apparatus, method, and program which allow communication of data for which transmission and reception assurance within a predetermined period of time is necessary and besides allow both of the transmission and receiver sides to perform data processes whose periods coincide with each other.

According to an embodiment of the present invention, an information processing apparatus is a component of an information processing system in which real time data for which transmission and reception assurance within a predetermined period of time after every fixed period is necessary is communicated through an asynchronous network. The information processing apparatus includes generating means and transmission controlling means. The generating means is configured to generate time synchronizing information, which is to be utilized upon setting of transmission and reception schedules of the real time data, as packets having a first region into which a sequence number, which varies after every period of time corresponding to the fixed period, is to be described. The transmission controlling means is configured to control the packets generated by the generating means such that one packet is transmitted to the asynchronous network at each transmission timing after the fixed period.

The packets generated by the generating means may further have a second region into which data for performing communication of shared information in the information processing system or divisional communication of the shared information are to be described.

The information processing apparatus may be configured such that the packets are classified into a plurality of types and transmitted by broadcast communication. The information processing apparatus further includes setting means configured to set that one of a plurality of transmission source port numbers individually corresponding in a one-by-one corresponding relationship to the plural types of the packets which corresponds to the type of a transmission object. The generating means generates the packets which further include the transmission source port number set by the setting means and are of the type corresponding to the transmission source port number set by the setting means.

Alternatively, the information processing apparatus may be configured such that the packets are classified into a plurality of types and transmitted by multicast communication. The information processing apparatus further includes setting means configured to set an Internet Protocol multicast address corresponding to the type of a transmission object from among a plurality of Internet Protocol multicast addresses corresponding in a one-by-one corresponding relationship to the plural types of the packets. The generating means generates the packets which further include the Internet Protocol multicast address set by the setting means and are of the type which correspond to the Internet Protocol multicast address set by the setting means.

The information processing apparatus may be configured such that the asynchronous network is divided into a plurality of virtual local area networks. The packets are classified into a plurality of types and are being transmitted by broadcast communication through that one of the virtual local area networks to which the information processing apparatus belongs. The information processing apparatus further includes setting means configured to set a virtual local area network identifier corresponding to the type of a transmission object from among a plurality of virtual local area network identifiers which individually correspond in a one-by-one corresponding relationship to the plural types of the packets. The generating means generates the packets which further include the virtual local area network identifiers set by the setting means and are of the type which corresponds to the virtual local area network identifier set by the setting means.

According to another embodiment of the present invention, an information processing method is for an information processing apparatus which is a component of an information processing system in which real time data for which transmission and reception assurance within a predetermined period of time after every fixed period is necessary is communicated through an asynchronous network. The information processing method includes the steps of generating time synchronizing information, which is to be utilized upon setting of transmission and reception schedules of the real time data, as packets having a region into which a sequence number which varies after every period of time corresponding to the fixed period is to be described, and transmitting the generated packets such that one packet is transmitted to the asynchronous network at each transmission timing after the fixed period.

According to a further embodiment of the present invention, a program corresponds to the information processing method described above.

In the information processing apparatus, method, and program, the following process is executed by the information processing apparatus which is a component of the information processing system in which real time data for which transmission and reception assurance within the predetermined period of time after every fixed period is necessary is communicated through the asynchronous network. In particular, time synchronizing information which is to be utilized upon setting of transmission and reception schedules of the real time data are generated as packets having a first region into which a sequence number which varies after every period of time corresponding to the fixed period is to be described. Then, the packets generated are transmitted to the asynchronous network such that one packet is transmitted at each transmission timing after the fixed period.

According to a still further embodiment of the present invention, an information processing apparatus is a component of an information processing system in which real time data for which transmission and reception assurance within a predetermined period of time after every fixed period is necessary is communicated through an asynchronous network. The information processing apparatus includes receiving means, determining means, and detecting means. The receiving means is configured to receive packets, when the packets having a first region in which a sequence number which varies after every period of time corresponding to the fixed period is described are transmitted as time synchronizing information, which is to be utilized upon setting of transmission and reception schedules of the real time data, from a different information processing apparatus to the information processing apparatus through the asynchronous network. The determining means is configured to decide whether or not the packets received by the receiving means are packets of the time synchronizing information. The detecting means is configured to detect the sequence number from those of the packets received by the receiving means which are decided as the time synchronizing information by the determining means.

The information processing apparatus may be configured such that the packets of the time synchronizing information further have a second region in which data for performing communication of shared information in the information processing system or divisional communication of the shared information are described. The detecting means further detects the data from those packets which are decided as the time synchronizing information by the determining means.

The information processing apparatus may be configured such that the packets of the time synchronizing information are classified into a plurality of types and transmitted by broadcast communication. The information processing apparatus further includes that one of a plurality of transmission source port numbers individually corresponding in a one-by-one corresponding relationship to the plural types of the packets which corresponds to the type of a transmission object to the different information processing apparatus. The determining means decides whether or not the packets are packets of the time synchronizing information of the type of a reception object based on a transmission source port number included in the packets received by the receiving means.

Alternatively, the information processing apparatus may be configured such that the packets are classified into a plurality of types and transmitted by multicast communication. Each of the packets further includes an Internet Protocol multicast address corresponding to the type of a transmission object to the different information processing apparatus from among a plurality of Internet Protocol multicast addresses which correspond in a one-by-one corresponding relationship to the plural types of the packets. The determining means decides whether or not the packets are packets of the time synchronizing information of the type of a reception object based on an IP multicast address included in the packets received by the receiving means.

The information processing apparatus may be configured such that the asynchronous network is divided into a plurality of virtual local area networks. The packets of the time synchronizing information are classified into a plurality of types. The packets are transmitted by broadcast communication through that one of the virtual local area networks to which the different information processing apparatus and the information processing apparatus belong. Each of the packets further includes a virtual local area network identifier corresponding to the type of a transmission object to the different information processing apparatus from among a plurality of virtual local area network identifiers which correspond in a one-by-one corresponding relationship to the plural types of the packets. The determining means decides whether or not the packets are packets of the time synchronizing information of the type of a reception object based on a virtual local area network identifier included in the packets received by the receiving means.

According to a yet further embodiment of the present invention, an information processing method is for an information processing apparatus which is a component of an information processing system in which real time data for which transmission and reception assurance within a predetermined period of time after every fixed period is necessary is communicated through an asynchronous network. The information processing method includes the step of receiving packets, when the packets having a first region in which a sequence number which varies after every period of time corresponding to the fixed period is described are transmitted as time synchronizing information, which is to be utilized upon setting of transmission and reception schedules of the real time data, from a different information processing apparatus to the information processing apparatus through the asynchronous network. The method also includes the step of deciding whether or not the received packets are packets of the time synchronizing information, and detecting the sequence number from those of the received packets which are decided as the time synchronizing information.

According to a yet further embodiment of the present invention, a program corresponds to the information processing method described above.

In the information processing apparatus, method, and program, the following process is executed by the information processing apparatus which is a component of the information processing system in which real time data for which transmission and reception assurance within the predetermined period of time after every fixed period is necessary is communicated through the asynchronous network. In particular, when packets having a first region in which a sequence number which varies after every period of time corresponding to the fixed period is described are transmitted as time synchronizing information, which is to be utilized upon setting of transmission and reception schedules of the real time data, from a different information processing apparatus to the information processing apparatus through the asynchronous network, the packets are received. Then, it is decided whether or not the received packets are packets of the time synchronizing information. Thereafter, the sequence number is detected from those of the received packets which are decided as the time synchronizing information.

In summary, with the information processing apparatus, methods, and the programs, communication of data can be achieved. In particular, communication of data for which transmission and reception assurance within a predetermined period of time is necessary can be achieved. Besides, data processing that the periods of both of the transmission and receiver sides coincide with each other can be achieved.

DETAILED DESCRIPTION OF THE PREFERRED EMBODIMENTS

Figure 1:
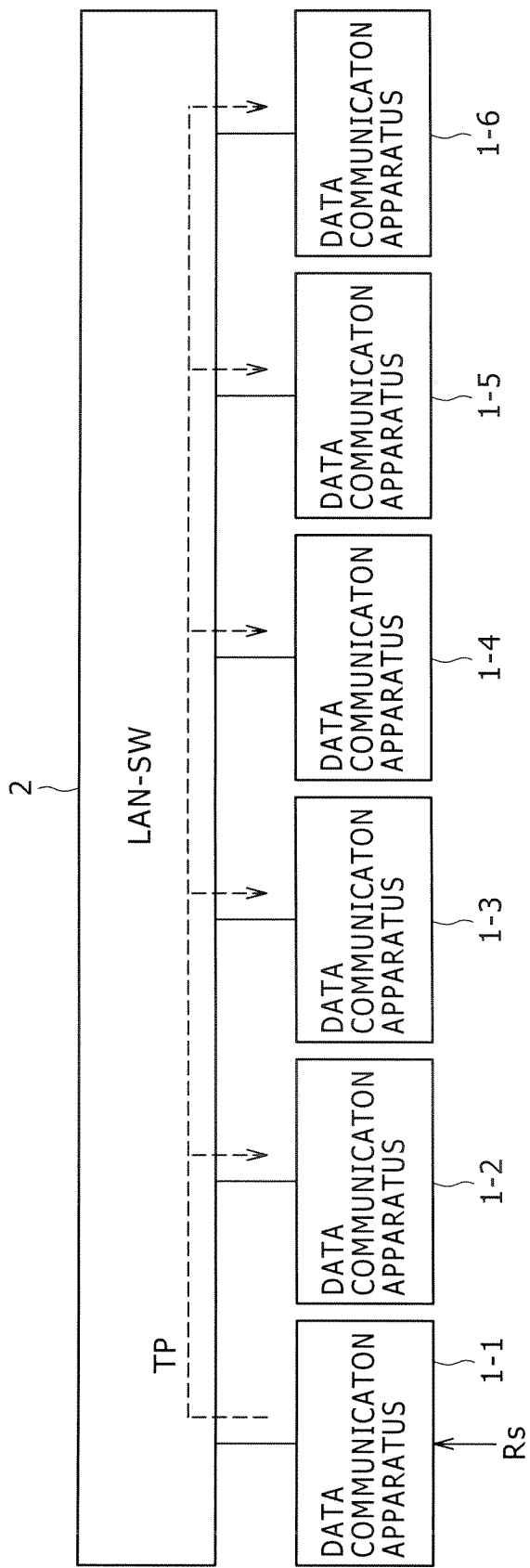
FIG. 1 is a block diagram showing an example of a configuration of an information processing system according to an embodiment of the present invention.

Before preferred embodiments of the present invention are described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiments of the present invention. Accordingly, even if some particular element which is recited in description of the embodiments is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiments of the present invention is all described in the claims. In other words, the following description does not deny the presence of an invention which corresponds to a particular element described in the description of the embodiments of the present invention but is not recited in the claims. That is, the description does not deny the presence of an invention which may be filed for patent in a divisional patent application or may be additionally included into the present patent application as a result of later amendment to the claims.

According to an embodiment of the present invention, an information processing apparatus (for example, a data communication apparatus 1-1 of FIG. 1) is a component of an information processing system (for example, any of information processing systems of FIGS. 1 and 3 to 5) in which real time data for which transmission and reception assurance within a predetermined period of time after every fixed period is necessary is communicated through an asynchronous network. The information processing apparatus includes generating means and transmission controlling means. The generating means (for example, a timing packet generation section 24 of FIG. 7) is configured to generate time synchronizing information, which is to be utilized upon setting of transmission and reception schedules (for example, schedules in FIG. 2) of the real time data, as packets (for example, a timing packet TP having a region denoted as sequence number in FIGS. 8 to 10) having a first region into which a sequence number which varies after every period of time corresponding to the fixed period is to be described. The transmission controlling means (for example, a transmission packet control section 27 of FIG. 7) is configured to control the packets generated by the generating means such that one packet is transmitted to the asynchronous network at each transmission timing after the fixed period.

The packets generated by the generating means may further have a second region (region denoted as DATA of FIG. 10) into which data for performing communication of shared information in the asynchronous network or divisional communication of the shared information are to be described.

The information processing apparatus may be configured such that the packets are classified into a plurality of types and transmitted by broadcast communication. In this instance, the information processing apparatus further includes setting means (for example, a timing packet transmission address table setting section 25 of FIG. 7) configured to set that one of a plurality of transmission source port numbers individually corresponding in a one-by-one corresponding relationship to the plural types of the packets which corresponds to the type of a transmission object. Further, the generating means generates the packets (for example, a timing packet TP that such a transmission source port number as mentioned above is described in a region denoted as transmission source port number in a UDP header in FIG. 11) which further include the transmission source port number set by the setting means and are of the type corresponding to the transmission source port number set by the setting means.

Alternatively, the information processing apparatus may be configured such that the packets are classified into a plurality of types and transmitted by multicast communication. In this instance, the information processing apparatus further includes setting means (for example, a timing packet transmission address table setting section 25 of FIG. 7) configured to set an Internet Protocol multicast address corresponding to the type of a transmission object from among a plurality of Internet Protocol multicast addresses corresponding in a one-by-one corresponding relationship to the plural types of the packets. The generating means generates the packets (for example, a timing packet TP that such an IP multicast address as mentioned above is described in a region denoted as destination IP address in an IP header in FIG. 12) which further include the Internet Protocol multicast address set by the setting means and are of the type which correspond to the Internet Protocol multicast address set by the setting means.

The information processing apparatus may be configured such that the asynchronous network is divided into a plurality of virtual local area networks (VLANs). In this instance, the packets are classified into a plurality of types and are transmitted by broadcast communication through that one of the virtual local area networks to which the information processing apparatus belongs. The information processing apparatus further includes setting means (for example, a timing packet transmission address table setting section 25 of FIG. 7) configured to set a virtual local area network identifier corresponding to the type of a transmission object from among a plurality of virtual local area network identifiers (VIDs, VLAN Identifiers) which individually correspond in a one-by-one corresponding relationship to the plural types of the packets. The generating means generates the packets (for example, a timing packet TP that such a VID as mentioned above is described in a region denoted as VID in a tag in FIG. 13) which further include the virtual local area network identifiers set by the setting means and are of the type which corresponds to the virtual local area network identifier set by the setting means.

According to another embodiment of the present invention, an information processing method is for an information processing apparatus (for example, a data communication apparatus 1-1 of FIG. 1) which is a component of an information processing system (for example, any of information processing systems of FIGS. 1 and 3 to 5). The system communicates, through an asynchronous network, real time data for which transmission and reception assurance within a predetermined period of time after every fixed period is necessary. The information processing method includes the step of generating time synchronizing information, which is to be utilized upon setting of transmission and reception schedules of the real time data, as packets having a region into which a sequence number which varies after every period of time corresponding to the fixed period is to be described (for example, steps S1 to S3 of FIG. 14). The method further includes the step of transmitting the generated packets such that one packet is transmitted to the asynchronous network at each transmission timing after the fixed period (for example, step S4 of FIG. 14).

According to a further embodiment of the present invention, a program corresponds to the information processing method described above. The program is executed by a computer which includes, for example, a CPU 301 of FIG. 21 hereinafter described.

According to a still further embodiment of the present invention, an information processing apparatus (for example, a predetermined one of data communication apparatus 1-2 to 1-6 of FIG. 1) is a component of an information processing system (for example, any of information processing systems of FIGS. 1 and 3 to 5) in which real time data for which transmission and reception assurance within a predetermined period of time after every fixed period is necessary is communicated through an asynchronous network. The information processing apparatus includes receiving means (for example, a packet reception processing section 31 of FIG. 7) configured to receive packets. The packets (for example, a timing packet TP having a region denoted as sequence number in FIGS. 8 to 10) having a first region in which a sequence number which varies after every period of time corresponding to the fixed period is described are transmitted as time synchronizing information, which is to be utilized upon setting of transmission and reception schedules (for example, schedules in FIG. 2) of the real time data, from a different information processing apparatus (for example, a data communication apparatus 1-1 of FIG. 1) to the information processing apparatus through the asynchronous network. The apparatus further includes determining means (for example, a packet filter section 32 of FIG. 7) configured to decide whether or not the packets received by the receiving means are packets of the time synchronizing information. The apparatus still further includes detecting means (for example, a timing packet detection section 34 of FIG. 7) configured to detect the sequence number from those of the packets received by the receiving means which are decided as the time synchronizing information by the determining means.

The information processing apparatus may be configured such that the packets of the time synchronizing information further have a second region (for example, a region denoted as DATA in FIG. 10) in which data for performing communication of shared information in the information processing system or divisional communication of the shared information are described. The detecting means further detects the data from those packets which are decided as the time synchronizing information by the determining means.

The information processing apparatus may be configured such that the packets of the time synchronizing information are classified into a plurality of types and transmitted by broadcast communication. The apparatus may further include that one (for example, a description value of a transmission source port number in a UDP header of FIG. 11) of a plurality of transmission source port numbers individually corresponding in a one-by-one corresponding relationship to the plural types of the packets which corresponds to the type of a transmission object to the different information processing apparatus. The determining means decides whether or not the packets are packets of the time synchronizing information of the type of a reception object based on a transmission source port number included in the packets received by the receiving means.

Alternatively, the information processing apparatus may be configured such that the packets are classified into a plurality of types and transmitted by multicast communication. In this instance, each of the packets further includes an Internet Protocol multicast address (for example, a description value of a destination IP address in an IP header of FIG. 12) corresponding to the type of a transmission object to the different information processing apparatus from among a plurality of Internet Protocol multicast addresses which correspond in a one-by-one corresponding relationship to the plural types of the packets. The determining means decides whether or not the packets are packets of the time synchronizing information of the type of a reception object based on an IP multicast address included in the packets received by the receiving means.

The information processing apparatus may be configured such that the asynchronous network is divided into a plurality of virtual local area networks (VLANs). In this instance, the packets of the time synchronizing information are classified into a plurality of types, and the packets are transmitted by broadcast communication through that one of the virtual local area networks to which the different information processing apparatus and the information processing apparatus belong. Each of the packets further includes a virtual local area network identifier (for example, a description value of a VID in a tag of FIG. 13) corresponding to the type of a transmission object to the different information processing apparatus from among a plurality of virtual local area network identifiers (VIDs, VLAN Identifiers) which correspond in a one-by-one corresponding relationship to the plural types of the packets. The determining means decides whether or not the packets are packets of the time synchronizing information of the type of a reception object based on a virtual local area network identifier included in the packets received by the receiving means.

According to a yet further embodiment of the present invention, an information processing method is for an information processing apparatus (for example, a predetermined one of data communication apparatus 1-2 to 1-6 of FIG. 1) which is a component of an information processing system (for example, information processing systems of FIGS. 1 and 3 to 5). The system communicates, through an asynchronous network, real time data for which transmission and reception assurance within a predetermined period of time after every fixed period is necessary. The information processing method includes the step of receiving packets (for example, step S12 of FIG. 15). The packets having a first region in which a sequence number which varies after every period of time corresponding to the fixed period is described are transmitted as time synchronizing information, which is to be utilized upon setting of transmission and reception schedules of the real time data, from a different information processing apparatus to the information processing apparatus through the asynchronous network. The method further includes the step of deciding whether or not the received packets are packets of the time synchronizing information (for example, step S12 of FIG. 15), and detecting the sequence number from those of the received packets which are decided as the time synchronizing information (for example, step S14 of FIG. 15).

According to a yet further embodiment of the present invention, a program corresponds to the information processing method described above. The program is executed by a computer which includes, for example, a CPU 301 of FIG. 21 hereinafter described.

In the following, several embodiments of the present invention are described.

FIG. 1 shows an example of a configuration of an information processing system according to an embodiment of the present invention.

Referring to FIG. 1, the information processing system shown includes six data communication apparatus 1-1 to 1-6 connected to a LAN switch (hereinafter referred to as LAN-SW) 2. In other words, the data communication apparatus 1-1 to 1-6 are interconnected by a LAN which is an example of an asynchronous network.

It is to be noted here that the number of data communication apparatus to be connected to the LAN-SW 2 is not limited to six as in the example of FIG. 1, but may be any number. This similarly applies also to the other embodiments including modifications thereto.

The data communication apparatus 1-1 receives a predetermined reference signal Rs as an input thereto from the outside and generates, based on the received reference signal Rs, time synchronizing information for setting a data transmission/reception schedule which is common in the information processing system as a packet. Such a packet as just mentioned is hereinafter referred to as timing packet TP. The data communication apparatus 1-1 transmits the timing packet TP to the data communication apparatus 1-2 to 1-6 by multicast or broadcast communication.

Consequently, all of the data communication apparatus 1-1 to 1-6 share the same time information. In other words, all of the data communication apparatus 1-1 to 1-6 operate with the sole standard time within the system and can transmit and receive various data packets in accordance with the common transmission/reception schedule.

Figure 2:
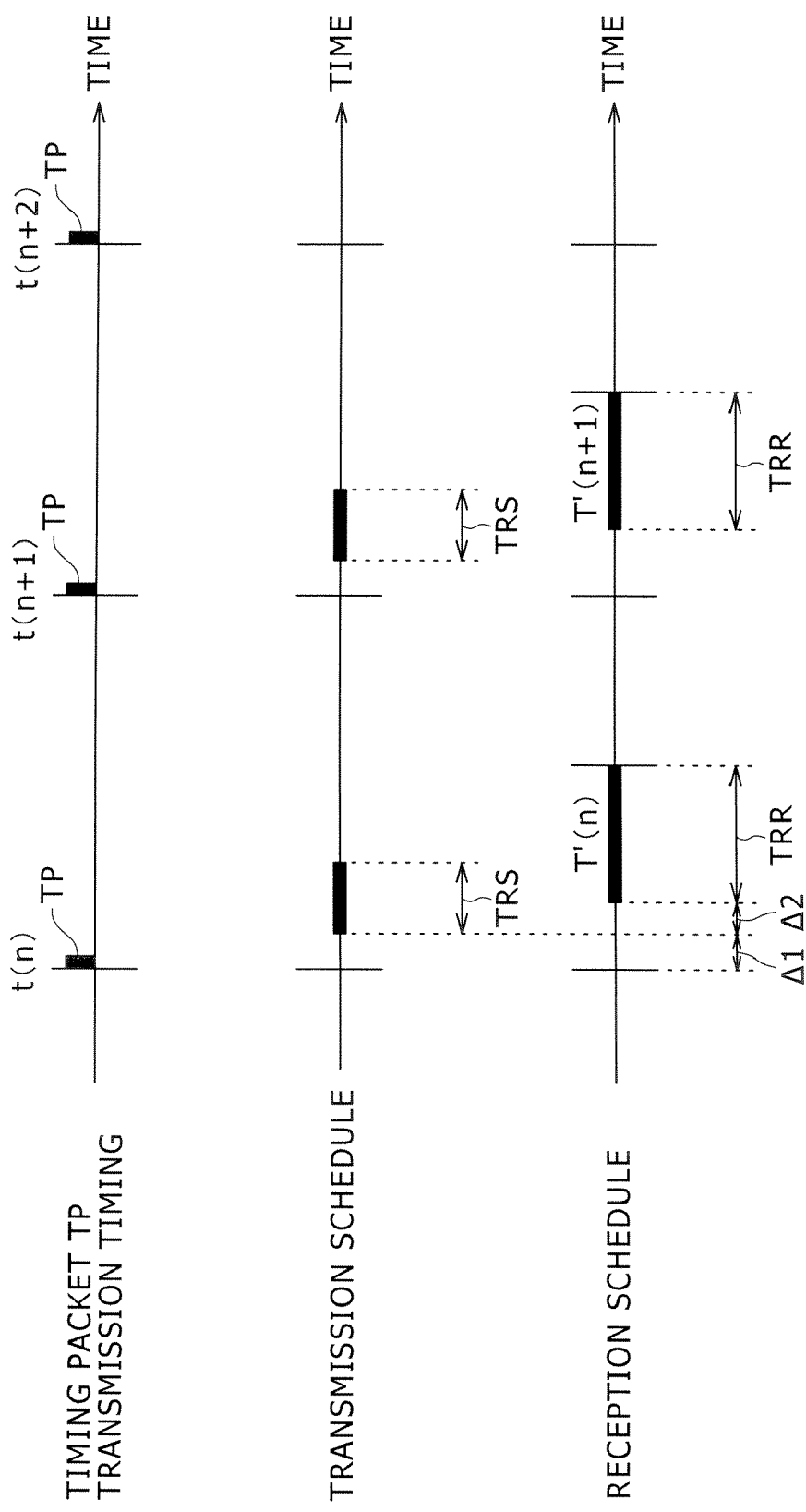
FIG. 2 is a diagrammatic view illustrating an example of a communication schedule used in the information processing system of FIG. 1.

An example of the common transmission/reception schedule (hereinafter referred to also as communication schedule) is illustrated in FIG. 2.

Referring to FIG. 2, a timing chart at the top illustrates an example of a transmission timing of a timing packet TP by the data communication apparatus 1-1. In the example of FIG. 2, the timing packet TP is broadcast periodically at the timings of times t(n), t(n+1), t(n+2)....

The data communication apparatus 1-2 to 1-6 receive the timing packet TP and synchronize the respective timers thereof with the times t(n), t(n+1), t(n+2).... In particular, for example, in the present embodiment, that a PLL section 22 outputs an output signal rt (refer to FIG. 7 or the like) as hereinafter described corresponds to synchronization of the timers.

A timing chart in the middle (second from the top) in FIG. 2 indicates an example of setting of a transmission schedule based on time indicated by a timer in the data communication apparatus 1-2 to 1-6. Further, a timing chart at the bottom in FIG. 2 indicates an example of setting of a Reception schedule based on the time indicated by the timer in the data communication apparatus 1-2 to 1-6. An application program corresponding to the transmission function and the reception function of the data communication apparatus 1-2 to 1-6 operates in accordance with the communication schedule.

In the transmission schedule, a predetermined time period TRS set for each of times t(n), t(n+1), t(n+2), ... indicates a signaling interval (time interval) of a data packets whose real time performance should be assured. Therefore, the predetermined time period is hereinafter referred to as RTP transmission interval TRS.

Further, a data packet whose real time performance should be assured is referred to as real time packet RTP In other words, the real time packet RTP is an example of data for which transmission/reception assurance within a predetermined period of time is necessary.

In the meantime, in the Reception schedule, a predetermined time period TRR set for each of times t(n), t(n+1), t(n+2), ... indicates a reception interval (time interval) of a real time packet RTP. Therefore, the predetermined time period TRR is hereinafter referred to as RTP reception interval TRR.

The RTP transmission interval TRS can be set, for example, in response to the transmission amount of real time packets RTP. Meanwhile, the RTP reception interval TRR can be set in response to packet arrival delay time unique to a LAN (asynchronous network to be used), timeout of T'(n), T'(n+1), ... set by an application program of a reception function, a processing time margin in data packet transmission for which a communication protocol for executing a re-sending process upon response confirmation, communication failure, and so forth is utilized, and so forth.

Incidentally, a period Δ1 is an error of a timer utilized by an application program of the data communication apparatus 1-2 to 1-6 with respect to times t(n), t(n+1), t(n+2), ... of the data communication apparatus 1-1.

Meanwhile, another period Δ2 is an error of the reception confirmation time by the application program of the reception function of the data communication apparatus 1-2 to 1-6 with respect to the sending time of a real time packet RTP.

Both errors are ideally equal to zero. The following description is given under the assumption that both errors are zero for simplified description.

It is to be noted that the times t(n), t(n+1), t(n+2), ... representing transmission timings of a timing packet TP need not necessarily be generated periodically. For example, a timing packet TP may be generated non-periodically, for example, in response to occurrence of the necessity for setting of the timeouts T'(n), T'(n+1), ... for reception by an application program of a reception function.

Further, each of the RTP transmission interval TRS and the RTP reception interval TRR need not necessarily be set in a one-by-one corresponding relationship at each of the times t(n), t(n+1), t(n+2), .... For example, a plurality of data communication apparatus may individually set a plurality of transmission intervals TRS and a plurality of RTP reception intervals TRR for each of the times t(n), t(n+1), t(n+2)....

In this manner, the information processing system (for example, FIG. 1) which makes use of an asynchronous network can utilize standard time specified by a timing packet TP signaled from one of the data communication apparatus to set a communication schedule (for example, FIG. 2) of the data communication apparatus and perform transmission and reception of data based on the communication schedule. As a result, the information processing system can communicate data (for example, a real time packet RTP) for which transmission and reception assurance within a predetermined period of time is necessary.

Figure 3:
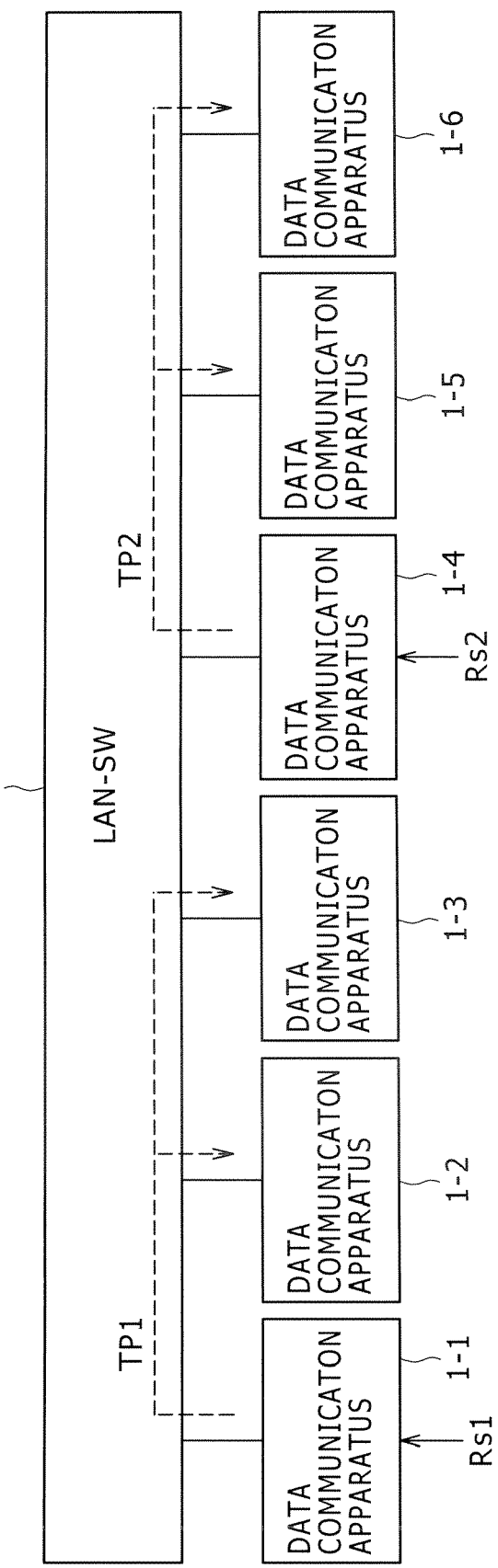
FIGS. 3, 4, and 5 are block diagrams showing different examples of a configuration of the information processing system according to an embodiment of the present invention.

FIG. 3 shows an example of a configuration of an information processing system which is different from that of FIG. 1 according to the embodiment of the present invention.

Also the information processing system of the example of FIG. 3 includes six data communication apparatus 1-1 to 1-6 connected to a LAN-SW 2.

However, in the example of FIG. 3, the data communication apparatus 1-1 to 1-3 share time synchronizing information based on a reference signal Rs1 while the data communication apparatus 1-4 to 1-6 share time synchronizing information based on another reference signal Rs2. In particular, the reference signal Rs1 is inputted to the data communication apparatus 1-1 from the outside, and a timing packet TP1 based on the reference signal Rs1 is transferred from the data communication apparatus 1-1 to the data communication apparatus 1-2 and 1-3 by multicast communication. Meanwhile, the reference signal Rs2 is inputted to the data communication apparatus 1-4 from the outside, and another timing packet TP2 based on the reference signal Rs2 is transferred from the data communication apparatus 1-4 to the data communication apparatus 1-5 and 1-6 by multicast communication.

Figure 4:
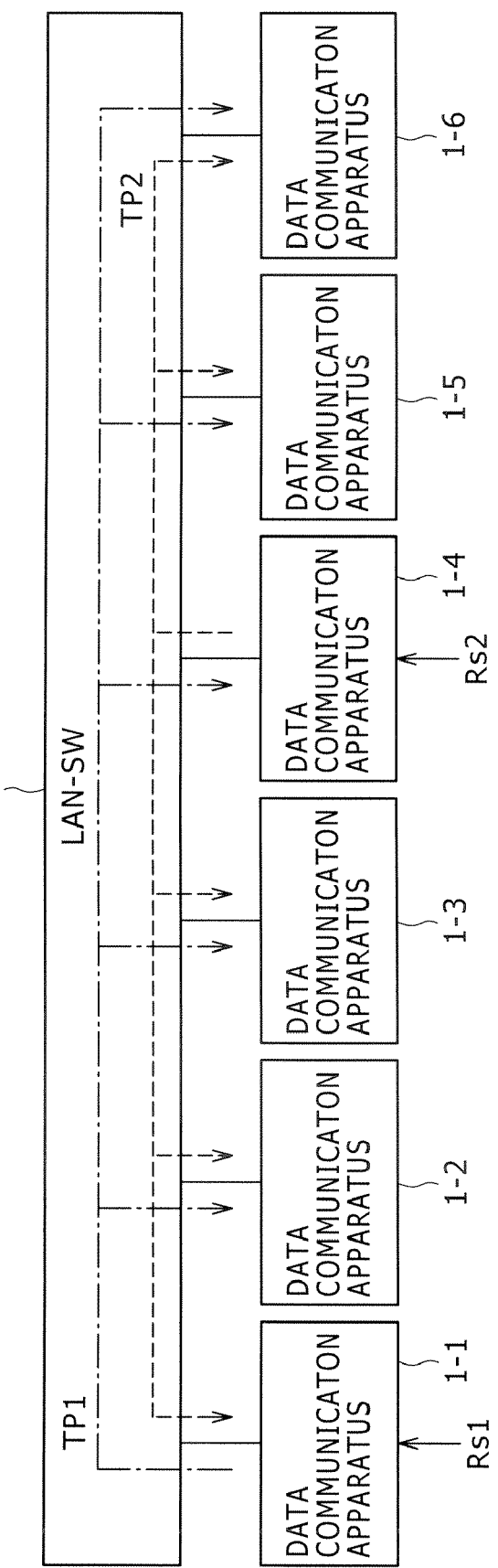

FIG. 4 shows an example of a configuration of an information processing system which is different from those of FIGS. 1 and 3 according to the embodiment of the present invention.

Also the information processing system of the example of FIG. 4 includes six data communication apparatus 1-1 to 1-6 connected to a LAN-SW 2.

Also in the example of FIG. 4, the data communication apparatus 1-1 to 1-3 share time synchronizing information based on a reference signal Rs1 while the data communication apparatus 1-4 to 1-6 share time synchronizing information based on another reference signal Rs2.

However, in the example of FIG. 4, the reference signal Rs1 is inputted to the data communication apparatus 1-1 from the outside, and a timing packet TP1 based on the reference signal Rs1 is transferred from the data communication apparatus 1-1 to the data communication apparatus 1-2 to 1-6 by broadcast communication. Further, the reference signal Rs2 is inputted to the data communication apparatus 1-4 from the outside, and a timing packet TP2 based on the reference signal Rs2 is transferred from the data communication apparatus 1-4 to the data communication apparatus 1-1 to 1-3, 1-5, and 1-6 by broadcast communication.

In this instance, the data communication apparatus 1-2 and 1-3 are set so as to identify the timing packet TP1 as a timing packet to be received and processed but abandon the timing packet TP2. Meanwhile, the data communication apparatus 1-1 is set so as to stop its timing packet reception function. Similarly, the data communication apparatus 1-5 and 1-6 are set so as to identify the timing packet TP2 as a timing packet to be received and processed but abandon the timing packet TP1. Meanwhile, the data communication apparatus 1-4 is set so as to stop its timing packet reception function.

Figure 5:
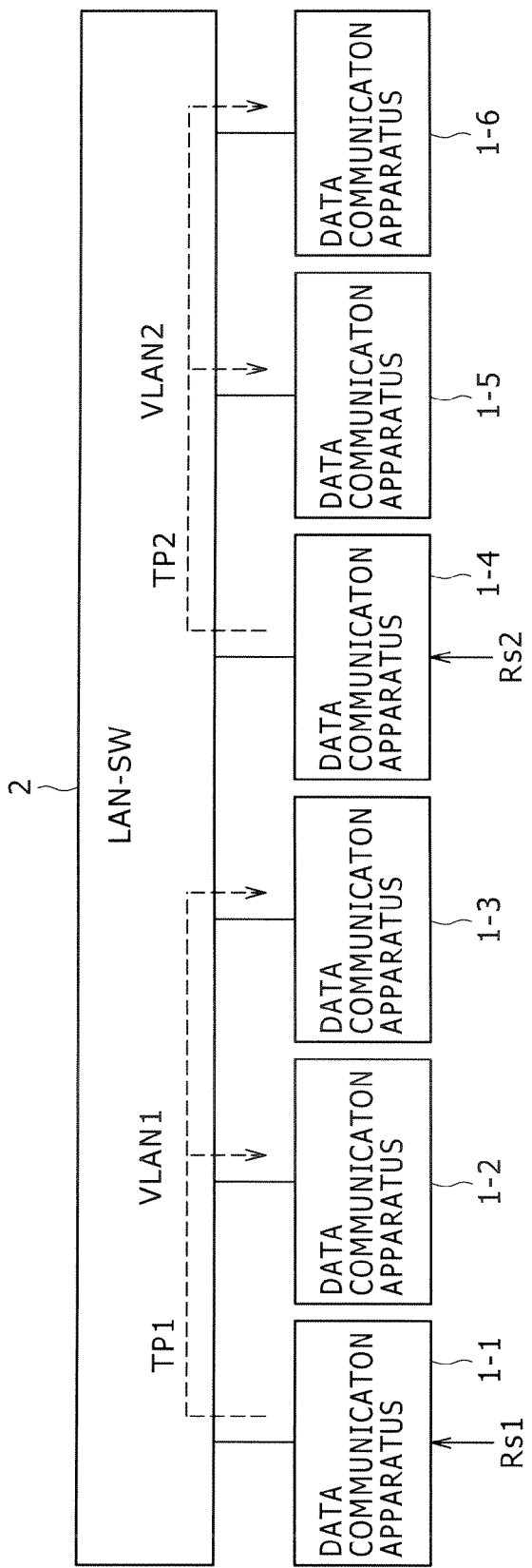

FIG. 5 shows an example of a configuration of an information processing system which is different from those of FIGS. 1, 3, and 4 according to the embodiment of the present invention is applied.

Also the information processing system of the example of FIG. 5 includes six data communication apparatus 1-1 to 1-6 connected to a LAN-SW 2.

However, in the example of FIG. 5, the data communication apparatus 1-1 to 1-3 which belong to a virtual local area network VLAN1 share time synchronizing information based on a reference signal Rs1 while the data communication apparatus 1-4 to 1-6 which belong to another virtual local area network VLAN2 share time synchronizing information based on another reference signal Rs2. In particular, the reference signal Rs1 is inputted to the data communication apparatus 1-1 from the outside, and a timing packet TP1 based on the reference signal Rs1 is transferred from the data communication apparatus 1-1 to the data communication apparatus 1-2 and 1-3 by broadcast communication. Meanwhile, the reference signal Rs2 is inputted to the data communication apparatus 1-4 from the outside, and a timing packet TP2 based on the reference signal Rs2 is transferred from the data communication apparatus 1-4 to the data communication apparatus 1-5 and 1-6 by broadcast communication.

In the examples described hereinabove with reference to FIGS. 1 to 5, the data communication apparatus 1-1 or each of the data communication apparatus 1-1 and 1-4 serves as an apparatus (hereinafter referred to as TP transmission apparatus) which acquires time synchronizing information from a reference signal Rs (Rs1 or Rs2) from the outside and transmits a corresponding timing packet TP. Meanwhile, each of the data communication apparatus 1-2, 1-3, 1-5 and 1-6 serves as an apparatus (hereinafter referred to as TP receiving apparatus) which receives a timing packet TP (TP, TP1, or TP2) from an asynchronous network and acquires time synchronizing information from the timing packet TP.

However, also each of the data communication apparatus 1-2, 1-3, 1-5, and 1-6 can function as a TP transmission apparatus if a reference signal Rs is inputted thereto. Further, also each of the data communication apparatus 1-1 and 1-4 can function as a TP receiving apparatus. In other words, each of the data communication apparatus 1-1 to 1-6 can function not only as a TP transmission apparatus but also as a TP receiving apparatus.

Therefore, in the following description, where there is no necessity to individually identify the data communication apparatus 1-1 to 1-6, each of them is referred to merely as data communication apparatus 1. An example of a functional configuration of the data communication apparatus 1 is shown in FIG. 6.

Figure 6:
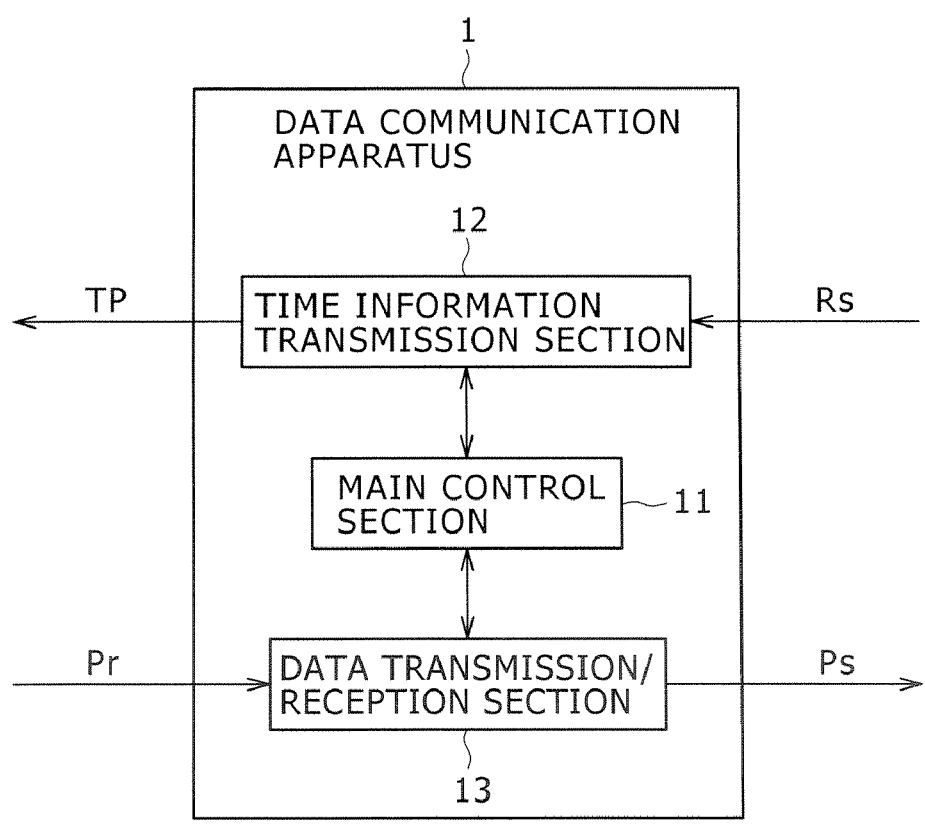
FIG. 6 is a block diagram showing an example of a functional configuration of a data communication apparatus of the information processing system of FIG. 1.

In the example of FIG. 6, the data communication apparatus 1 includes a main control section 11, a time information transmission section 12, and a data transmission/reception section 13.

The main control section 11 controls operation of the entire data communication apparatus 1. Upon such control, the main control section 11 suitably executes various application programs not shown for implementing not only such a reception function and a transmission function as described above but also various other functions as occasion demands.

The time information transmission section 12 produces a timing packet TP based on a reference signal Rs from the outside and transmits the timing packet TP to other data communication apparatus by multicast or broadcast communication.

The data transmission/reception section 13 receives various data packets (packets from other data communication apparatus are hereinafter referred to collectively as packets Pr) transmitted from other data communication apparatus and including a timing packet TP. Then, the data transmission/reception section 13 provides the received packets Pr to the main control section 11 or suitably executes various processes based on the packets Pr. Further, the data transmission/reception section 13 acquires various packets except the timing packet TP from the main control section 11 or itself produces such packets and transmits the packets (hereinafter referred to as packets Ps) to other data communication apparatus.

Figure 7:
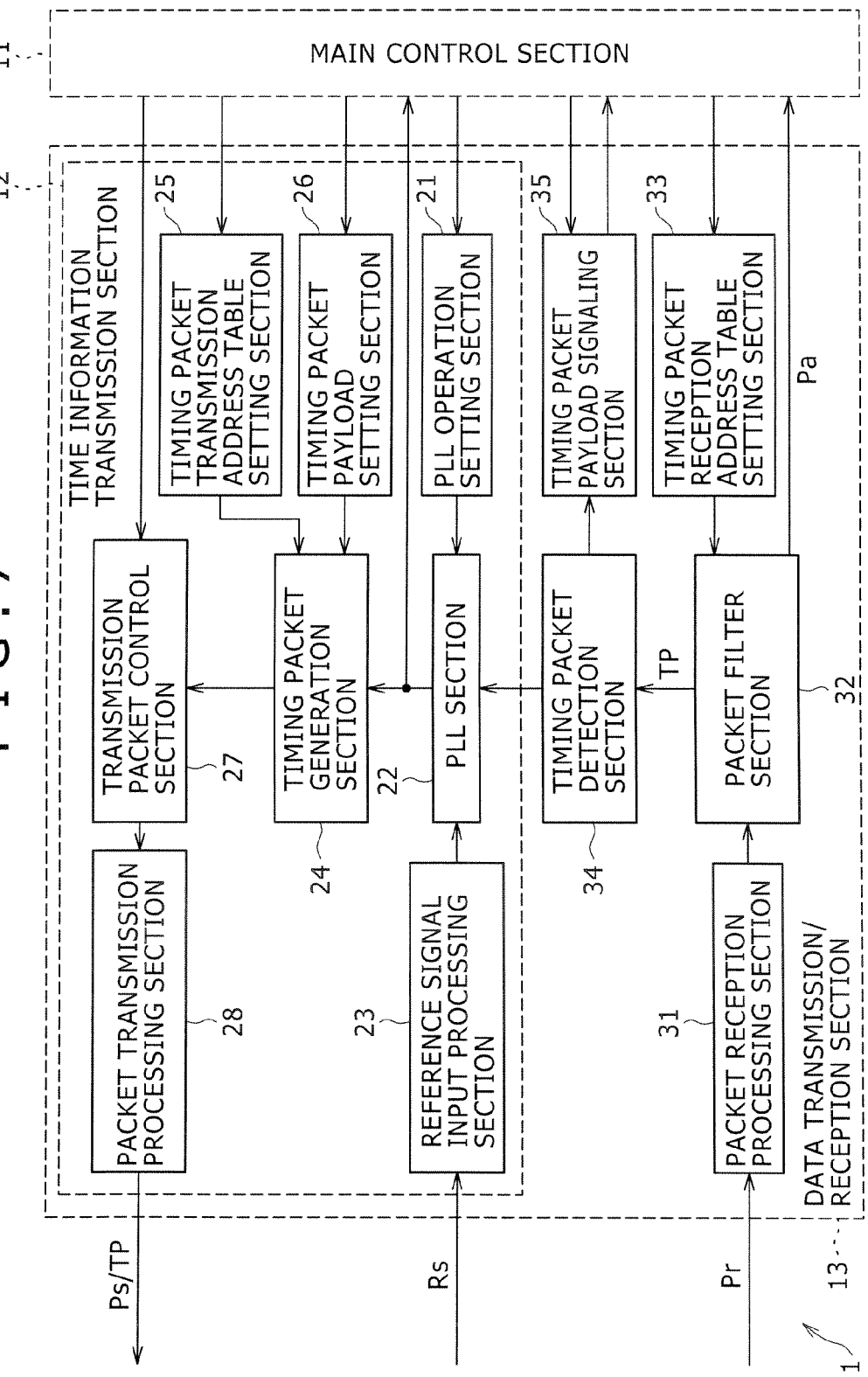
FIG. 7 is a block diagram showing an example of a detailed functional configuration of the data communication apparatus of FIG. 6.

Now, details of the time information transmission section 12 and the data transmission/reception section 13 are described with reference to FIG. 7. FIG. 7 shows an example of a more detailed functional configuration of the data communication apparatus 1.

In the example of FIG. 7, the data communication apparatus 1 includes, in addition to the data communication apparatus 1, a PLL operation setting section 21, a PLL section 22, a reference signal input processing section 23, and a timing packet generation section 24. The data communication apparatus 1 further includes a timing packet transmission address table setting section 25, a timing packet payload setting section 26, a transmission packet control section 27, and a packet transmission processing section 28. The data communication apparatus 1 further includes a packet reception processing section 31, a packet filter section 32, a timing packet reception address table setting section 33, a timing packet detection section 34, and a timing packet payload signaling section 35.

From among the components mentioned of the data communication apparatus 1, the components from the PLL operation setting section 21 to the packet transmission processing section 28 sometimes function as the time information transmission section 12, that is function as a TP transmission apparatus and sometimes function as part of the data transmission/reception section 13 or function as part of a TP receiving apparatus.

Setting of as which one of the apparatus the components should function is performed by the PLL operation setting section 21. In particular, control information regarding setting of as which one of the TP transmission apparatus and the TP receiving apparatus the data communication apparatus 1 should function, setting of the type of an reference signal Rs to be processed, and setting of the type of a timing packet TP to be processed is provided from the main control section 11 to the PLL operation setting section 21. Thus, the PLL operation setting section 21 performs various kinds of setting based on the control information, and produces control information (hereinafter referred to as PLL section control information) for controlling operation of the PLL section 22 based on the various kinds of setting. Then, the PLL operation setting section 21 provides the produced control information to the PLL section 22.

For example, if the setting for causing the data communication apparatus 1 to function as the TP transmission apparatus is provided as PLL section control information from the PLL operation setting section 21 to the PLL section 22, then the PLL section 22 sets an output signal of the reference signal input processing section 23 as a comparison signal. Then, the PLL section 22 performs control of synchronizing an output signal (hereinafter referred to as PLL output signal) thereof with the comparison signal. This PLL output signal is provided to the timing packet generation section 24.

In particular, the reference signal input processing section 23 receives the reference signal Rs as an input thereto from the outside, suitably performs various signal processes as occasion demands and provides a resulting signal to the PLL section 22.

The timing packet generation section 24 produces a timing packet TP based on the PLL output signal of the PLL section 22 and provides the timing packet TP to the transmission packet control section 27.

It is to be noted that the timing packet TP in the data communication apparatus 1 shown in FIG. 7 includes, for example, a timing packet header part and a timing packet payload part. In this instance, information necessary for generation of the timing packet header part is provided from the timing packet transmission address table setting section 25. On the other hand, information necessary for generation of the timing packet payload part is provided from the timing packet payload setting section 26.

In particular, the timing packet transmission address table setting section 25 produces information necessary for generation of the timing packet header part based on table setting information from the main control section 11 and outputs the generated information to the timing packet generation section 24. The "information necessary for generation of the timing packet header part" here is table information in which, for example, values to be set or used for an IP (Internet Protocol) address and a MAC (Media Access Control) address are described. Further, although details are hereinafter described with reference to FIGS. 11 to 13, in the data communication apparatus 1, also information (hereinafter referred to as TP specification information) for specifying or identifying a timing packet TP is included in the timing packet header part. Accordingly, also the TP specification information is part of the "information necessary for generation of the timing packet header part".

Further, the timing packet payload setting section 26 generates information necessary for generation of the timing packet payload part based on various kinds of information from the main control section 11 and outputs the generated information to the timing packet generation section 24. It is to be noted that the various kinds of information to be provided from the main control section 11 to the timing packet payload setting section 26 and a particular example of the timing packet payload part are hereinafter described.

The transmission packet control section 27 adjusts the output timing of a timing packet TP from the timing packet generation section 24 and provides the timing packet TP to the packet transmission processing section 28 at the adjusted output timing.

The packet transmission processing section 28 converts a timing packet TP from the transmission packet control section 27 into a timing packet of a format conforming to the asynchronous network and outputs the resulting timing packet to other data communication apparatus through the asynchronous network. It is to be noted that the conversion of a timing packet TP into a timing packet of a format conforming to the asynchronous network signifies, for example, to add a MAC header or the like where the asynchronous network is the Ethernet (registered trademark).

The blocks of the data communication apparatus 1 which operate when the data communication apparatus 1 functions as a TP transmission apparatus, that is, as the time information transmission section 12, are described above.

In the following, those blocks of the data communication apparatus 1 which operate when the data communication apparatus 1 functions as a TP receiving apparatus, that is, as the data transmission/reception section 13, are described.

In particular, for example, if the setting for causing the data communication apparatus 1 as a TP receiving apparatus is provided as PLL section control information from the PLL operation setting section 21 to the PLL section 22, then the PLL section 22 sets timing information from the timing packet detection section 34 as a comparison signal and performs control of synchronizing a PLL output signal thereof with the comparison signal.

The PLL output signal of the PLL section 22 is provided to the main control section 11. Consequently, the main control section 11 can execute various processes using the PLL output signal. For example, various packets are outputted from the main control section 11 in accordance with the transmission schedule of FIG. 2 and transmitted as a packet Ps through the transmission packet control section 27 and the packet transmission processing section 28 and through the asynchronous network to other data communication apparatus.

On the other hand, if a packet Pr is transmitted from another data communication apparatus to the data communication apparatus 1, then the packet reception processing section 31 receives the packet Pr through the asynchronous network and provides the packet Pr to the packet filter section 32.

The packet filter section 32 classifies packets Pr from the packet reception processing section 31 into a timing packet TP and a different packet Pa, and provides the timing packet TP and the different packet Pa to the timing packet detection section 34 and the main control section 11, respectively.

In this instance, information necessary for classification into a timing packet TP and a different packet Pa, that is, the TP specification information described above, is provided from the timing packet reception address table setting section 33. In particular, the timing packet reception address table setting section 33 generates TP specification information based on table setting information from the main control section 11 and outputs the TP specification information to the packet filter section 32. It is to be noted that particular examples of the table setting information and the TP specification information are hereinafter described with reference to FIGS. 11 to 13 and so forth.

The timing packet detection section 34 detects timing information necessary for operation of the PLL section 22 and description information of the timing packet payload part from the timing packet TP from the packet filter section 32. Further, the timing packet detection section 34 provides the description information of the timing packet payload part to the timing packet payload signaling section 35.

The timing packet payload signaling section 35 signals the information requested from the main control section 11 from within the description information of the timing packet payload part to the main control section 11 at a timing requested from the main control section 11. For example, in the present data communication apparatus 1, the information signaled from the timing packet payload signaling section 35 to the main control section 11 includes a sequence number (FIGS. 8 to 10) hereinafter described, a clock reference (FIGS. 9 and 10), data DATA (FIG. 10), and so forth.

Now, an example of a particular structure of a timing packet TP transmitted to and received by the data communication apparatus 1 which has the functional configuration described hereinabove with reference to FIG. 7 is described with reference to FIGS. 8 to 10.

Figure 8:
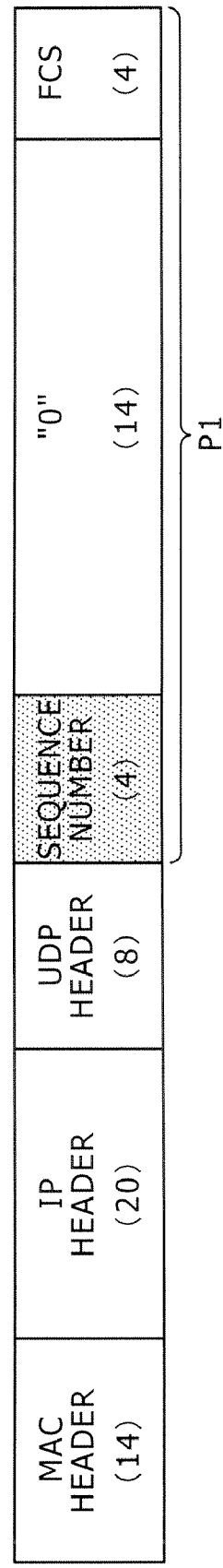
FIGS. 8 to 13 are diagrammatic views showing different examples of a structure of a timing packet used in the data communication apparatus of FIG. 6.
Figure 9:
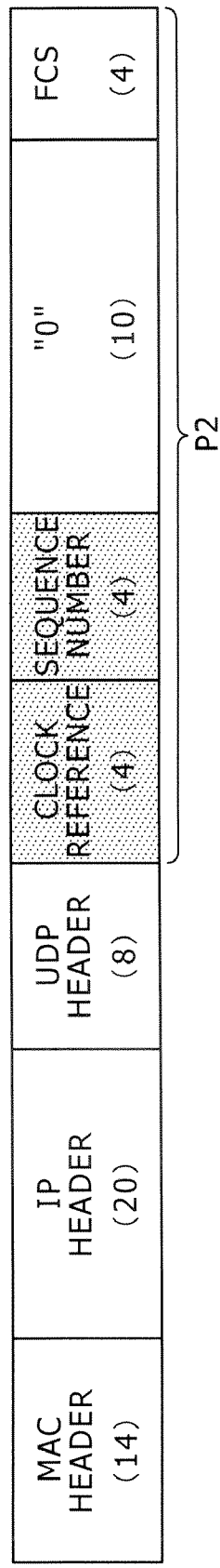
Figure 10:
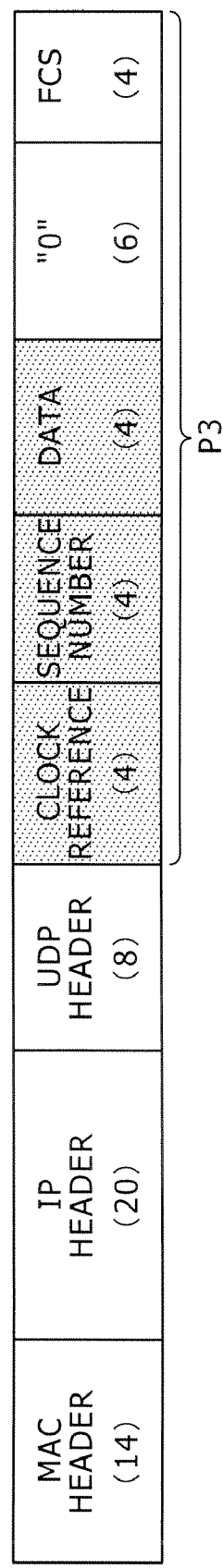

It is to be noted that a numerical value in parentheses in FIGS. 8 to 10 indicates the number of bytes of data.

The timing packet TP illustrated in FIG. 8 is a MAC packet of a total length of 64 bytes including a MAC (Media Access Control) header, an IP (Internet Protocol) header, a UDP (User Datagram Protocol) header, and a UDP payload part P1.

In the UDP payload part PI of the example of FIG. 8, a sequence number of 4 bytes is placed at the top, and an FCS (Frame Check Sequence) is placed at four bytes of the tail end.

The sequence number here is a number which varies after every period of time corresponding to the signaling period of the timing packets TP. The sequence number is generated by the PLL section 22 of FIG. 7 and placed into and provided together with a PLL output signal thereof to the timing packet generation section 24.

The sequence number can be utilized, for example, for setting or confirmation of a periodical timing at which packet transmission is to be performed such as, for example, a periodical timing of the RTP transmission interval TRS of FIG. 2. The sequence number can be utilized also for confirmation of a periodical timing at which a packet is to be received such as, for example, a periodical timing of the RTP reception interval TRR of FIG. 2.

The timing packet TP of the example of FIG. 9 is a MAC packet of a total length of 64 bytes composed of a MAC header, an IP header, a UDP header, and a UDP payload part P2.

In the UDP payload part P2 of the example of FIG. 9, a clock reference is placed at four bytes at the top, and a sequence number is placed at succeeding four bytes. Further, an FCS is placed at the tail end.

The clock reference is generated together with a sequence number by the PLL section 22 of FIG. 7 and placed into and provided together with a PLL output signal thereof to the timing packet generation section 24.

The clock reference can be utilized as information for satisfying, for example, such a demand as to use the same frequency in various applications in two or more data communication apparatus 1 in the information processing system of FIGS. 1 to 5 and so forth.

The timing packet TP of the example of FIG. 10 is a MARC packet of a total length of 64 bytes composed of a MAC header, an IP header, a UDP header, and a UDP payload part P3.

In the UDP payload part P3 of the example of FIG. 10, a clock reference is placed at four bytes at the top, and a sequence number is placed at succeeding four bytes. Data DATA is placed at further succeeding four bytes, and an FCS is placed at four bytes at the tail end.

For the data DATA, basically arbitrary information can be utilized. In other words, there is no particular restriction to the utilization of the data DATA. For example, shared information of the entire information processing system of FIGS. 1 to 5 and so forth can be utilized as the data DATA. In particular, for example, where the data communication apparatus 1 which functions as a TP transmission apparatus additionally has a management function of shared information in the information processing system (asynchronous network system), the data DATA can be utilized for describing the shared information. Consequently, the necessity to separately prepare a packet for exclusive use for communication within the information processing system can be eliminated. It is to be noted that, as such shared information, for example, various kinds of information such as information relating to an operation state of the asynchronous network system, information relating to the configuration state of the network, and a notification of a timestamp can be adopted.

Information of which one of the UDP payload part P1 of FIG. 8, UDP payload part P2 of FIG. 9, and UDP payload part P3 of FIG. 10 described above should be set as the timing packet payload part is generated, in the present data communication apparatus 1, by the main control section 11 and provided to the timing packet payload setting section 26. Consequently, the timing packet payload setting section 26 generates information that the UDP payload part is set as the timing packet payload part as indicated in the information mentioned above at least as part of the information necessary for generation of the timing packet payload part. Then, the timing packet payload setting section 26 outputs the generated information to the timing packet generation section 24.

Further, in the present data communication apparatus 1, where the information indicating that the UDP payload part P3 of FIG. 10 is set as the timing packet payload part is provided to the timing packet payload setting section 26, the main control section 11 provides also the description information itself of the data DATA or information necessary for generation of the description information of the data DATA to the timing packet payload setting section 26. In this instance, the timing packet payload setting section 26 generates description information of the data DATA together with the information representing that the UDP payload part P3 is set as the timing packet payload part at least as part of the information necessary for generation of the timing packet payload part. Then, the timing packet payload setting section 26 outputs the generated description information of the data DATA to the timing packet generation section 24.

Now, several particular examples of an identification method of a timing packet TP are described with reference to FIGS. 11 to 13. It is to be noted that, while the timing packets TP illustrated in FIGS. 11 to 13 have the structure of the example of FIG. 10, the identification method described below can be applied also to a timing packet TP of any other structure such as the structure of the example of FIG. 8 or 9.

Figure 11:
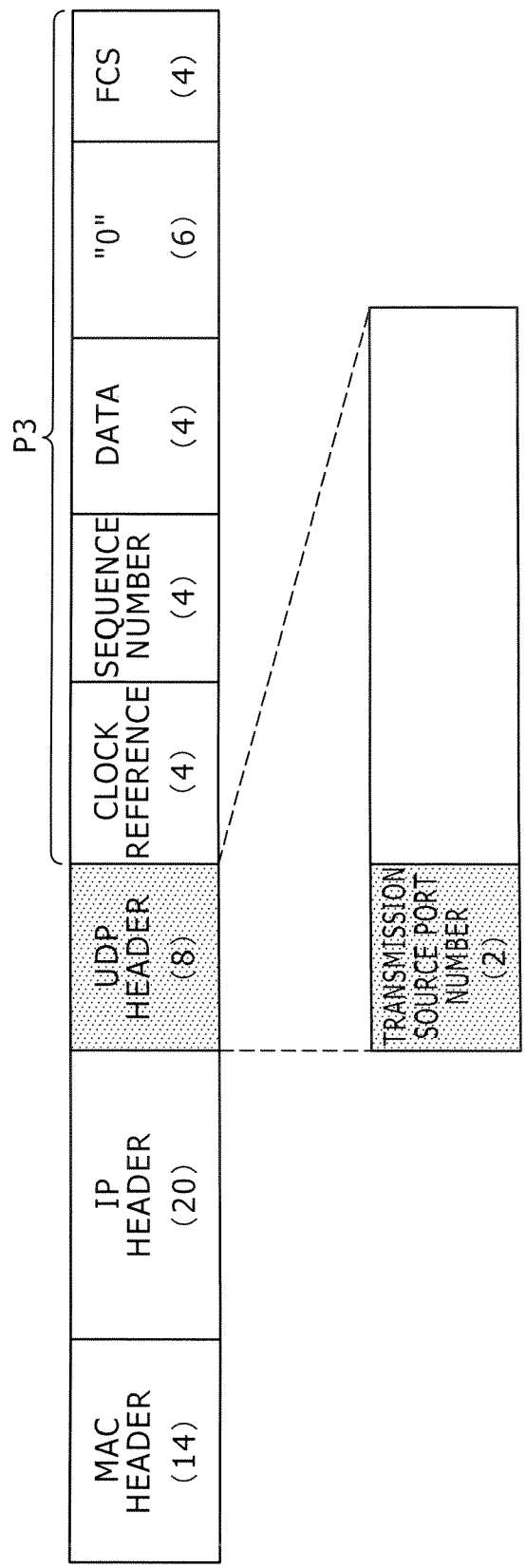

The identification method illustrated in FIG. 11 makes use of a sender port number of 2 bytes of the UDP header part as IP specification information to identify the timing packet TP. As the contents of the identification, for example, the type of the reference signal Rs (difference in type) can be adopted. In particular, for example, the difference in frequency such as 50 Hz/60 Hz, the difference in phase such as lead/delay, or the difference in system such as HDTV (High-Definition Television)/SDTV (Standard Definition Television) systems can be adopted as the identification contents. For example, in the present data communication apparatus 1, the main control section 11 coordinates each sender port number with one of a plurality of different types of the reference signal Rs to generate table setting information representative of such coordinated relationships. Then, the main control section 11 provides the generated table setting information to the timing packet transmission address table setting section 25 and the timing packet reception address table setting section 33.

Figure 12:
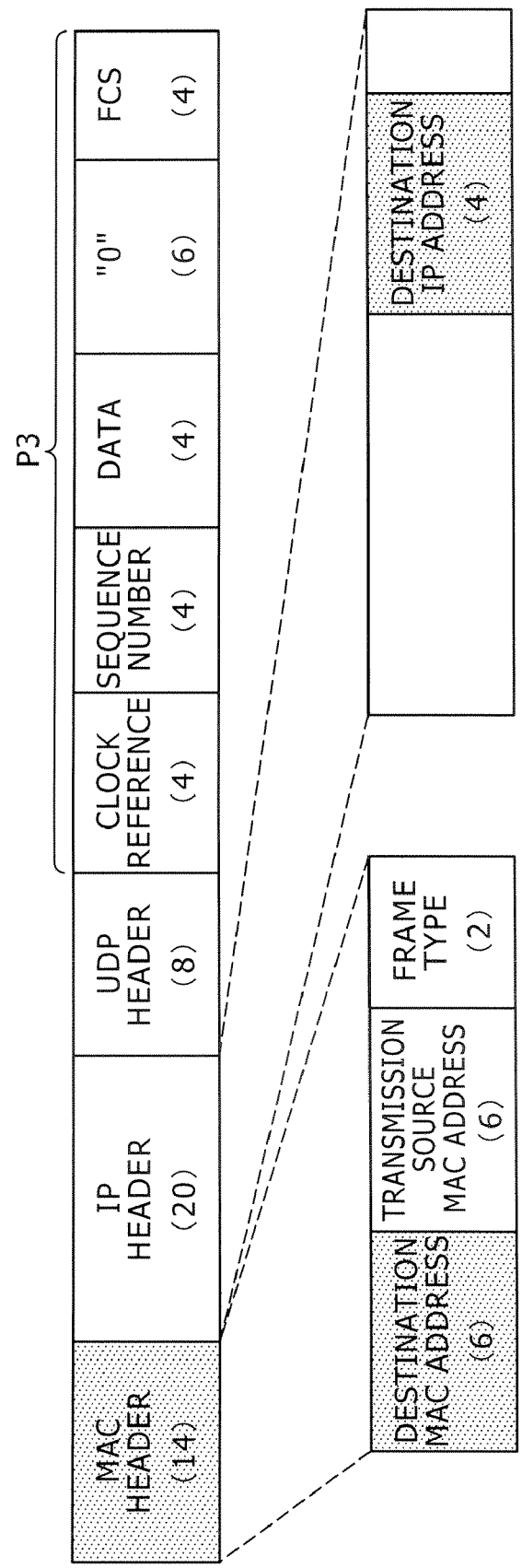

Meanwhile, the identification method illustrated in FIG. 12 utilizes an IP multicast address (destination IP address of 4 bytes of the IP header part) as the TP specification information to identify the timing packet TP. As the identification contents, the type of the reference signal Rs (difference in type) can be adopted similarly as in the case of, for example, FIG. 11. In this instance, in the present data communication apparatus 1, the main control section 11 coordinates one IP multicast address with each of a plurality of types of the reference signal Rs to produce table setting information indicative of such coordinated relationships. Then, the main control section 11 provides the generated table setting information to the timing packet transmission address table setting section 25 and the timing packet reception address table setting section 33. It is to be noted that an address produced by incorporating the lower order 23 bits of the set IP multicast address as the lower order 23 bits of 01-00-5E-00-00-00 (hexadecimal notation) becomes a destination MAC address of the MAC header.

Figure 13:
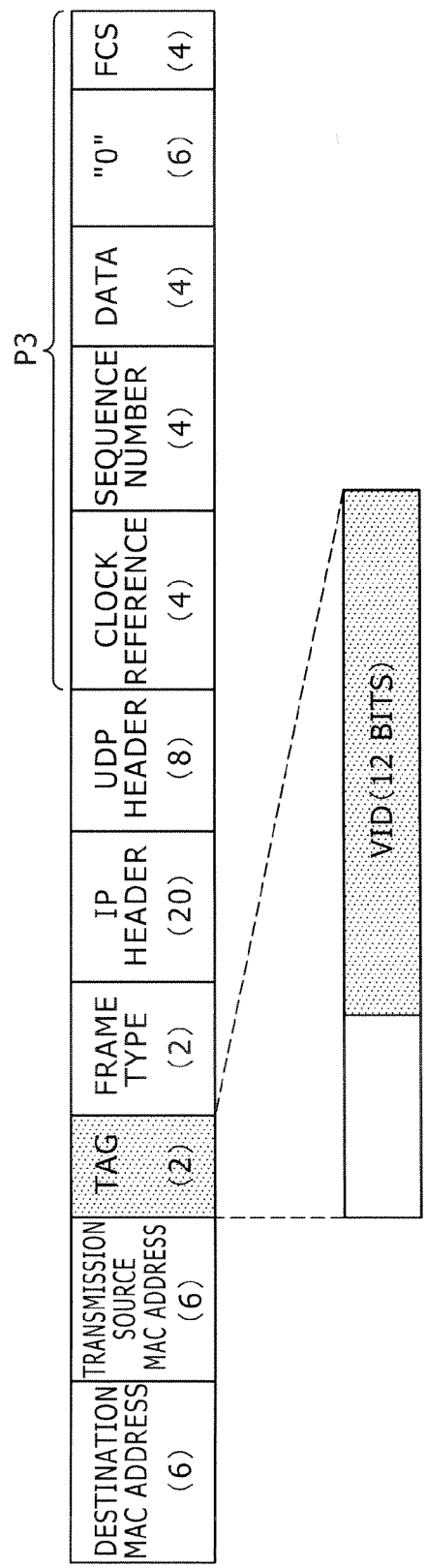

Further, the identification method illustrated in FIG. 13 utilizes a VID of 12 bits of a VLAN tag (tag of gray indication in FIG. 13) as the TP specification information to identify the timing packet TP. As the identification contents, the type of the reference signal Rs (difference in type) can be adopted similarly, for example, as in the cases of FIGS. 11 and 12. In this instance, for example, in the present data communication apparatus 1, the main control section 11 coordinates each VID with one of a plurality of different types of the reference signal Rs to generate table setting information representative of such coordinated relationships. Then, the main control section 11 provides the generated table setting information to the timing packet transmission address table setting section 25 and the timing packet reception address table setting section 33.

Several examples of the particular structure of the timing packet TP are described above with reference to FIGS. 8 to 13. However, it is to be noted that the structure of the timing packet TP is not limited to those of FIGS. 8 to 13, but the timing packet TP may be a packet which serves as time synchronizing information which is utilized upon setting of transmission/reception schedules of real time data for which transmission and reception assurance within a predetermined period of time for every fixed period is necessary and which has a region into which a sequence number which varies after a period of time corresponding to the fixed period is to be described. Further, the timing packet TP may preferably have a region into which data for performing communication of shared information in the information processing system or for performing divisional communication of the shared structure is to be described. Further, the timing packet TP may be formed as a packet which includes IP specification information for specifying the timing packet TP.

Now, a process (hereinafter referred to as timing packet transmission process) until a timing packet TP is transmitted from within a process executed by the data communication apparatus 1 having the functional configuration of FIG. 7 is described below with reference to FIG. 14.

In the data communication apparatus 1, the timing packet transmission process is executed every time a reference signal Rs is inputted periodically. In other words, the timing packet transmission process is executed every time a PLL output signal is outputted from the PLL section 22 which operates using the reference signal Rs as a comparison signal.

At step S1, the timing packet generation section 24 utilizes information from the timing packet transmission address table setting section 25 to generate a timing packet header part including the IP specification information described hereinabove.

At step S2, the timing packet generation section 24 utilizes the information from the timing packet payload setting section 26 to generate a sequence number and a clock reference described hereinabove and a timing packet payload part including at least the sequence number in the data DATA described hereinabove. In other words, in the example described above, one of the UDP payload part P1 of FIG. 8, UDP payload part P2 of FIG. 9, and UDP payload part P3 of FIG. 10 is generated as a timing packet payload part.

Figure 14:
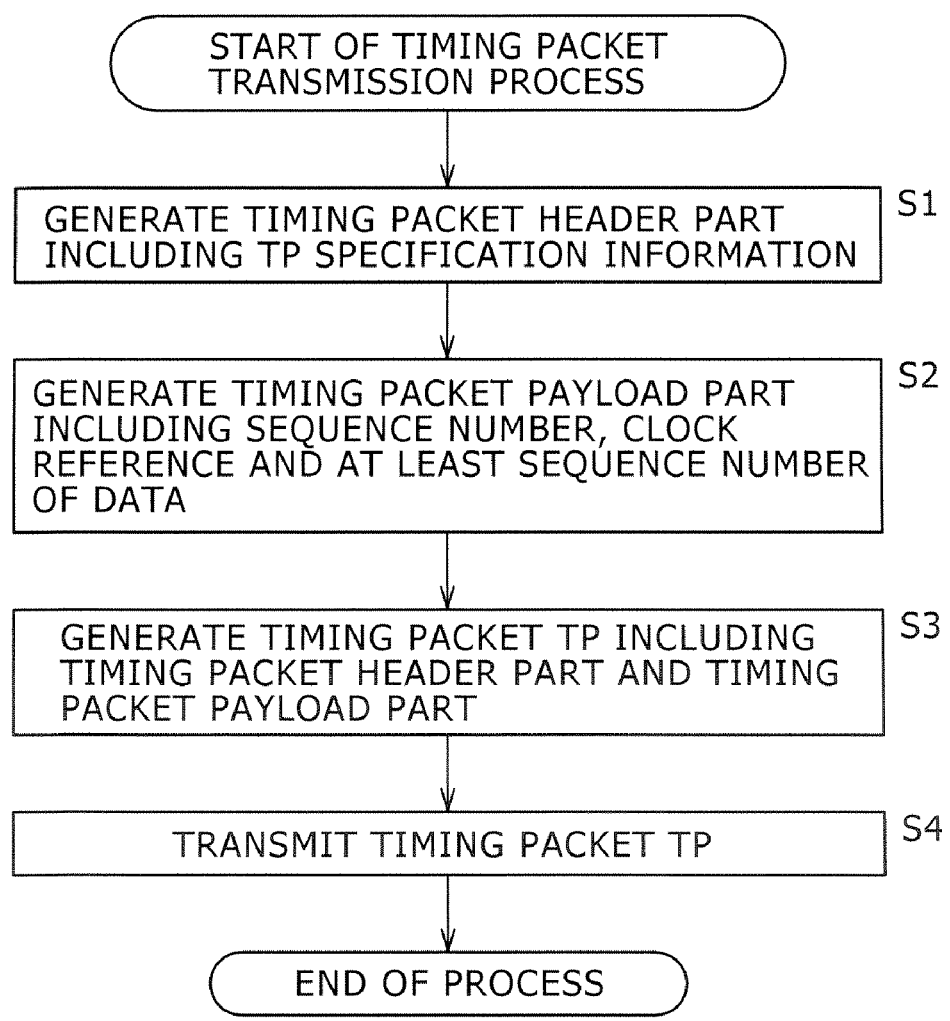
FIG. 14 is a flow chart illustrating an example of a timing packet transmission process from within a process executed by the data communication apparatus of FIG. 7.

It is to be noted that the processing order of the processes at steps S1 and S2 is not limited to that of the example of FIG. 14 but may be any arbitrary order. In other words, the process at step S1 may be executed after the process at step S2 is executed first, or the processes at steps S1 and S2 may be executed substantially at the same time.

At step S3, the timing packet generation section 24 generates a timing packet TP composed of the timing packet header part and the timing packet payload part and provides the timing packet TP to the transmission packet control section 27.

At step S4, the transmission packet control section 27 adjusts the transmission timing and transmits the timing packet TP at the adjusted transmission timing to the asynchronous network through the packet transmission processing section 28.

Figure 15:
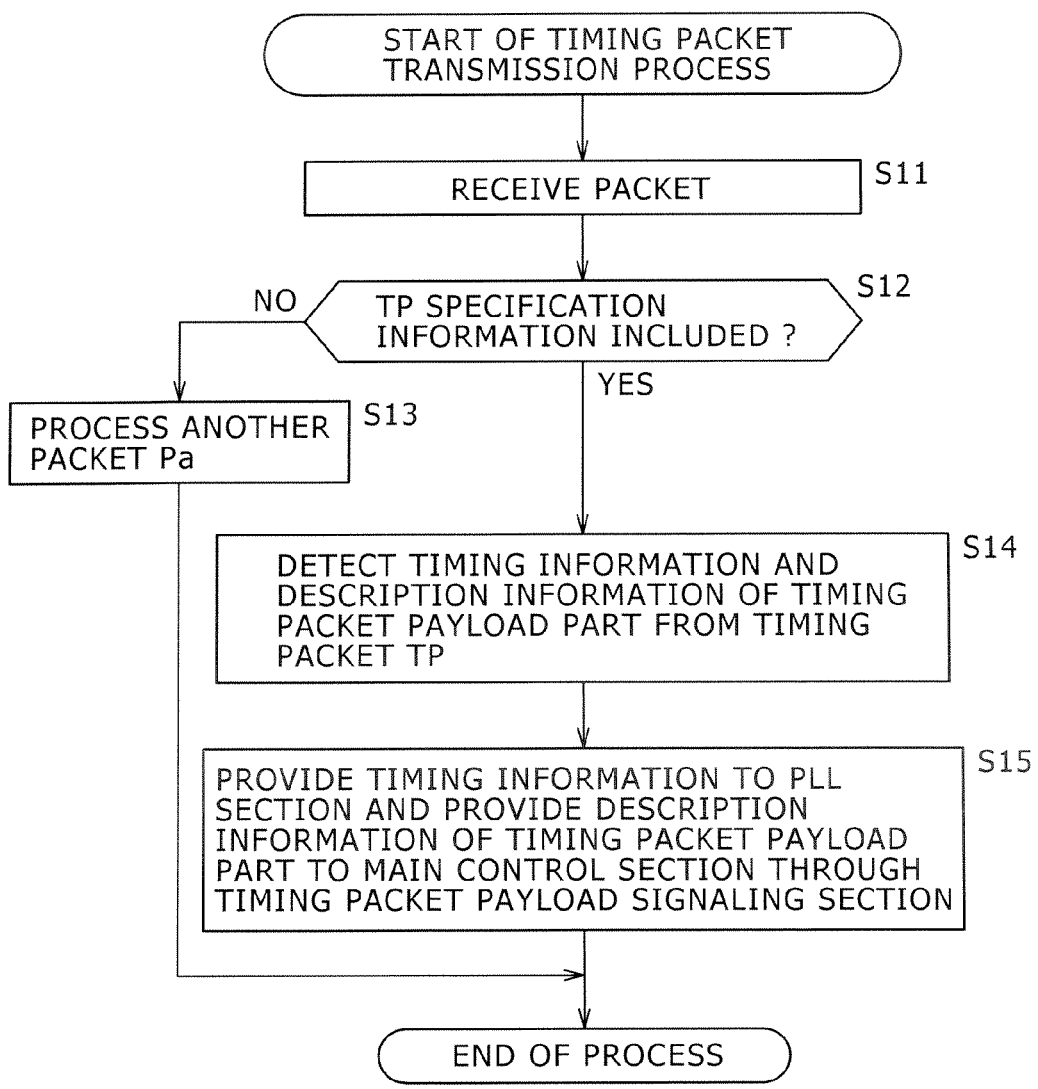
FIG. 15 is a flow chart illustrating an example of a timing packet reception process from within the process executed by the data communication apparatus of FIG. 7.

Now, a process until a timing packet TP is received (the process is hereinafter referred to as timing packet reception process) from within the process executed by the data communication apparatus 1 having the functional configuration of FIG. 7 is described with reference to FIG. 15.

At step S11, the packet reception processing section 31 receives a packet Pr and provides the packet Pr to the packet filter section 32.

At step S12, the packet filter section 32 decides whether or not the packet Pr includes TP specification information.

If it is decided at step S12 that the packet Pr does not include TP specification information, then the packet filter section 32 processes the packet Pr as a different packet Pa at step S13. In other words, the packet Pr is provided as a different packet Pa to the main control section 11, by which various processes are executed suitably based on the different packet Pa. The timing packet reception process ends therewith.

On the other hand, if it is decided at step S12 that TP specification information is included, then the packet filter section 32 provides the packet Pr as a timing packet TP to the timing packet detection section 34. Then, the processing advances to step S14.

At step S14, the timing packet detection section 34 detects timing information and description information of the timing packet payload part from the timing packet TP. At step S15, the timing packet detection section 34 provides the timing information to the PLL section 22 and provides the description information of the timing packet payload part to the main control section 11 through the timing packet payload signaling section 35. The timing packet reception process ends therewith.

The systems having such configurations as seen in FIGS. 1 to 5 are described as different embodiments of the information processing system according to the embodiment of the present invention is applied. However, the present invention is not limited to the embodiments described above with reference to FIGS. 1 to 5 but can be carried out in various other forms.

Figure 16:
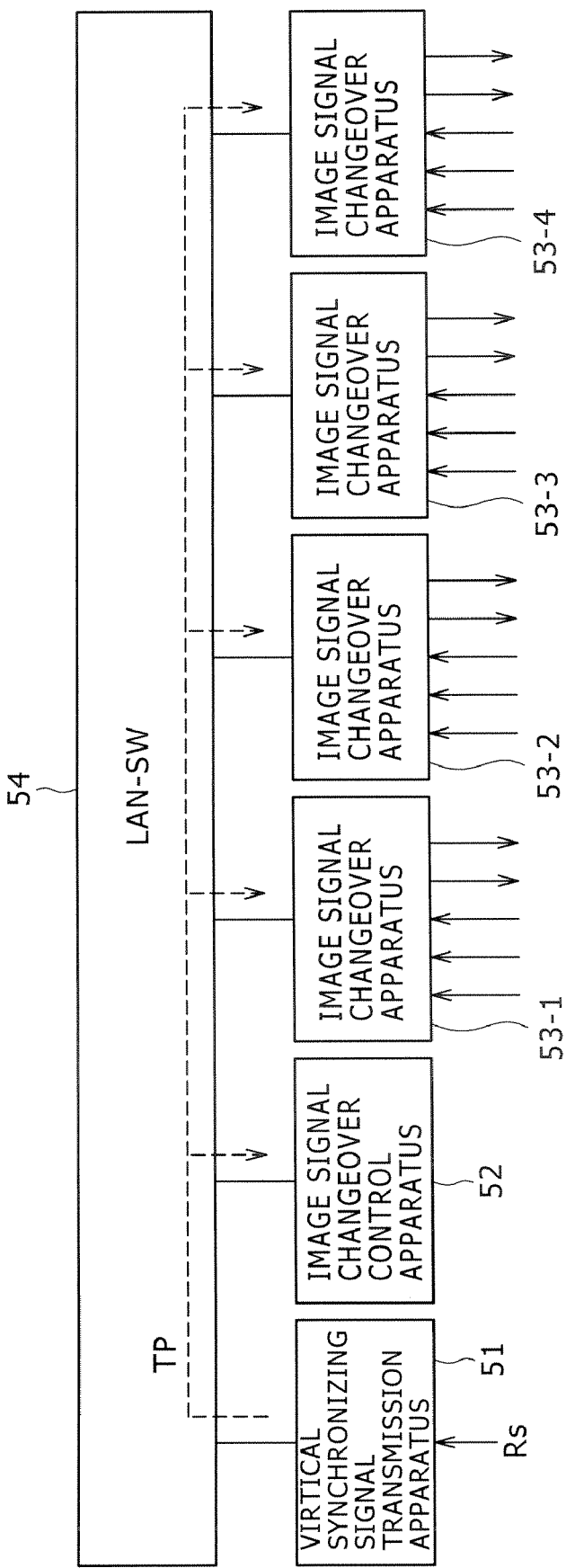
FIGS. 16 to 18 are block diagrams showing further different examples of the configuration of the information processing system according to an embodiment of the present invention.
Figure 17:
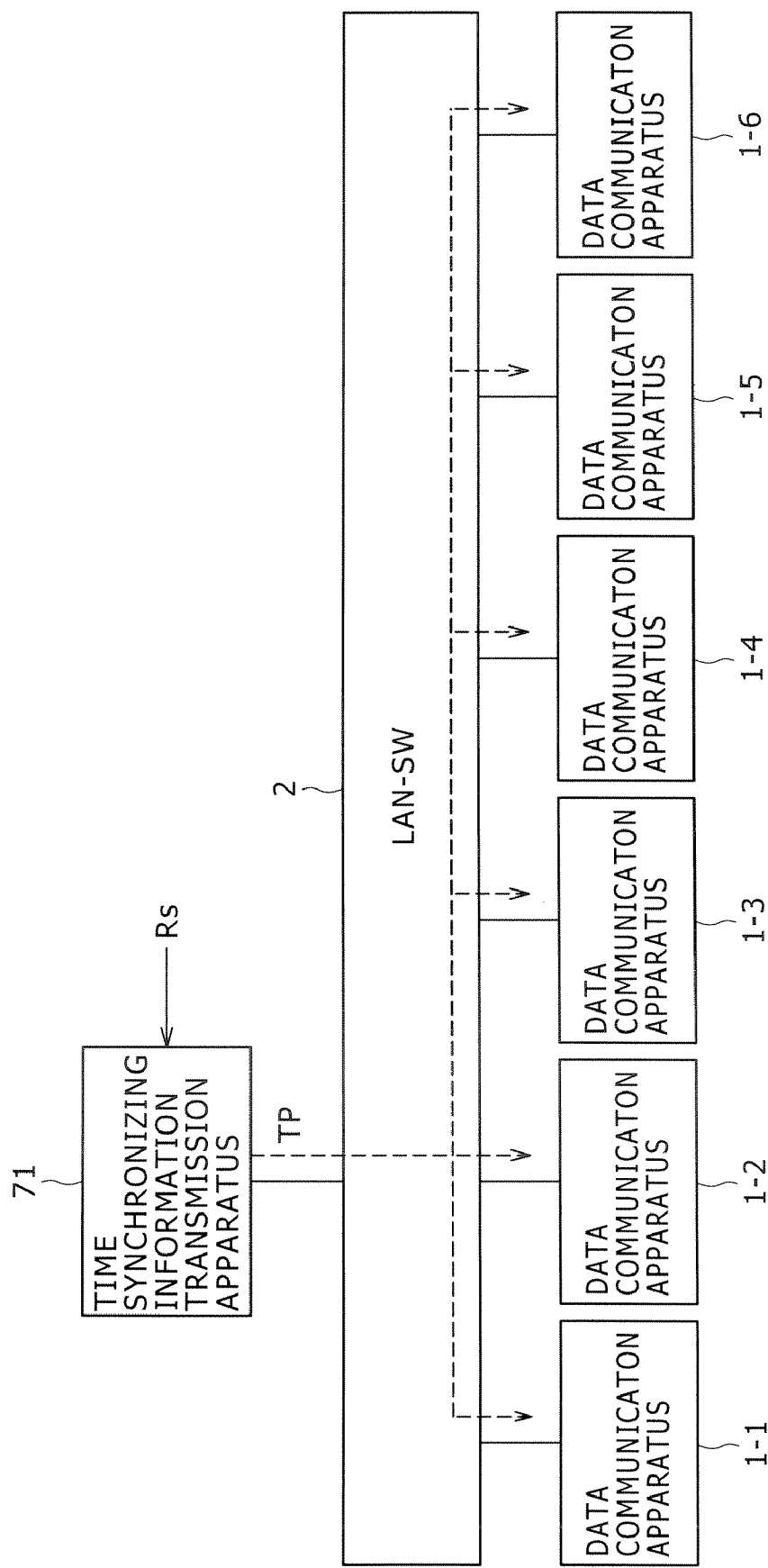
Figure 18:
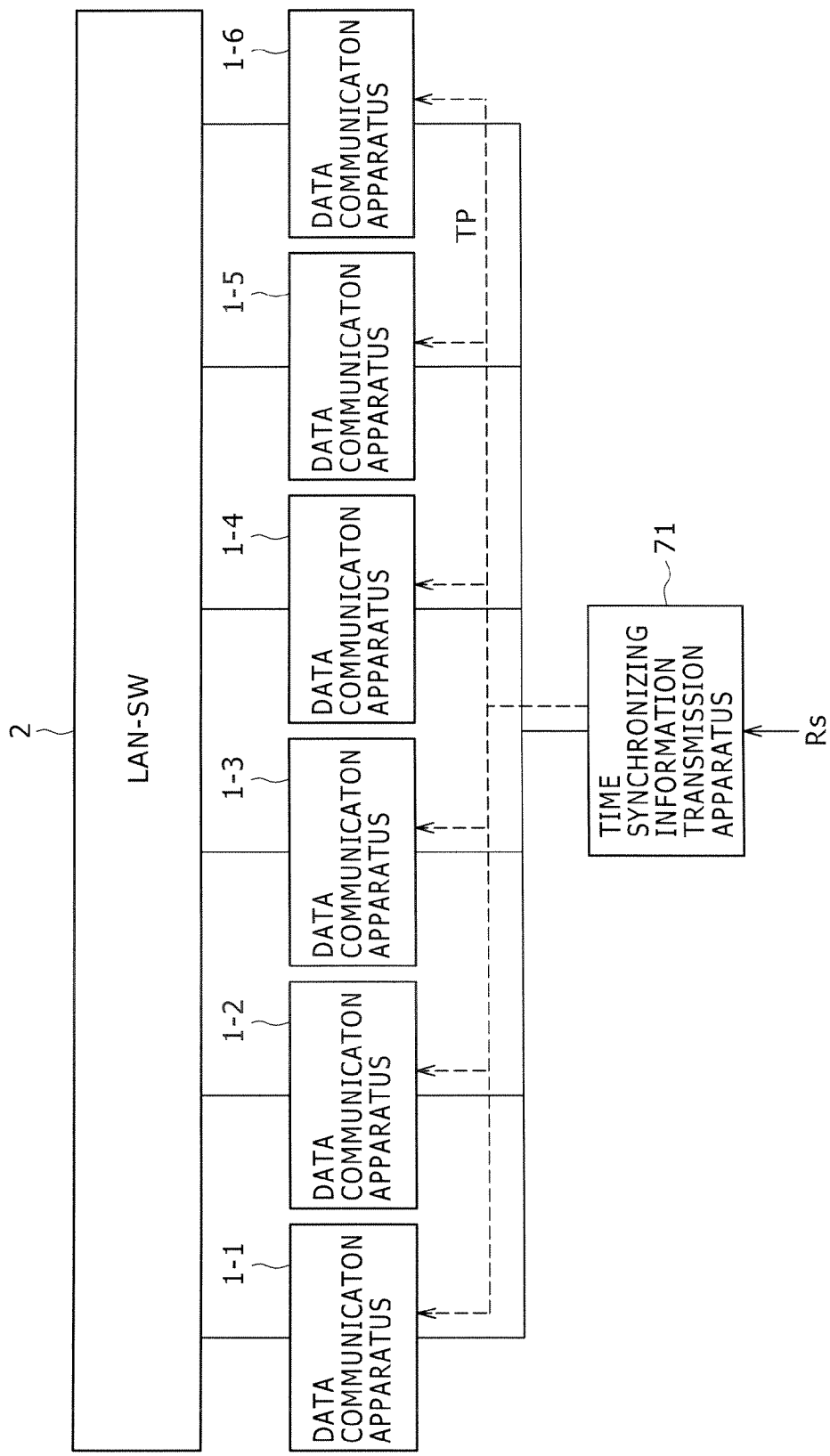

In particular, different information processing systems according to the embodiment of the present invention is applied are shown in FIGS. 16 to 18.

Particularly, FIG. 16 shows an application to an image signal changeover system as a different form of the embodiment of the present invention.

Referring to FIG. 16, the image signal changeover system shown includes a vertical synchronizing information transmission apparatus 51, an image signal changeover control apparatus 52, and image signal changeover apparatus 53-1 to 53-4 all connected to a LAN-SW 54.

In particular, in the configuration of the image signal changeover system of FIG. 16, the data communication apparatus 1-1 is adopted as the vertical synchronizing information transmission apparatus 51, and the data communication apparatus 1-2 is adopted as the image signal changeover control apparatus 52. Further, the data communication apparatus 1-3 to 1-6 are adopted as the image signal changeover apparatus 53-1 to 53-4.

The image signal changeover apparatus 53-1 to 53-4 receive three image input signals (in FIG. 16, indicated by arrow marks inputted to blocks representing the apparatus) as a selection object and have a function of outputting two selected image signals as image output signals (in FIG. 16, indicated by arrow marks outputted from the blocks representing the apparatus).

In the example of FIG. 16, a vertical synchronizing signal is outputted as a timing packet TP from the vertical synchronizing information transmission apparatus 51 and provided to the image signal changeover control apparatus 52 and the image signal changeover apparatus 53-1 to 53-4 through a LAN (through the LAN-SW 54). As a result, a common vertical synchronizing signal is reproduced in the information processing system. The image signal changeover control apparatus 52 and the image signal changeover apparatus 53-1 to 53-4 operate using the vertical synchronizing signal as common time information.

Here, changeover of image signals in the image signal changeover apparatus 53-1 to 53-4 is executed in a timed relationship with the timing of the vertical synchronizing signal. In this instance, the image signal changeover control apparatus 52 generates a control command for controlling the changeover of the image signals and transmits the control command as a real time packet RTP to the image signal changeover apparatus 53-1 to 53-4 through the LAN (through the LAN-SW 54). In other words, the image signal changeover apparatus 53-1 to 53-4 operate in accordance with the control command received as the real time packet RTP and execute a changeover process of the image signals in accordance with the control command.

In other words, in the example of FIG. 16, the control command for controlling changeover of image signals is an example of data for which transmission and reception assurance within a predetermined period of time is necessary.

In the information processing system of FIG. 16, also it is possible to adopt an apparatus with a monitoring function for the image signal changeover control apparatus 52 and adopt an apparatus having a function ready for monitoring for the image signal changeover apparatus 53-1 to 53-4.

The function ready for monitoring here signifies a function of packetizing an image signal designated by the image signal changeover control apparatus 52 with a monitoring function from within image input signals and image output signals and transmitting resulting packets. Further, the monitoring function signifies a function of receiving and displaying a packetized image signal.

It is assumed here that a display image is displayed in accordance with a vertical synchronizing signal transmitted as a timing packet TP from the vertical synchronizing information transmission apparatus 51. However, it is assumed that the changeover timing of the display image permits an error of a unit of a field or the like. In this instance, although also the image signal packet can be handled as a real time packet RTP, it can be handled as a data packet of a nature different from that of a control command whose real time performance described above should be assured.

Meanwhile, the information processing system of the example of FIG. 17 includes, in addition to such six data communication apparatus 1-1 to 1-6 as described hereinabove, an apparatus (hereinafter referred to as time synchronizing information transmission apparatus 71) for exclusive use for transmitting time synchronizing information (in the present embodiment, a timing packet TP) connected to a LAN-SW 2.

On the other hand, the information processing system of the example of FIG. 18 includes six data communication apparatus 1-1 to 1-6, a LAN-SW 2, and a time synchronizing information transmission apparatus 71 similarly as in the example of FIG. 17. However, the time synchronizing information transmission apparatus 71 is not connected to the LAN-SW 2, but only the data communication apparatus 1-1 to 1-6 are connected to the LAN-SW 2.

Consequently, in the example of FIG. 18, a timing packet TP transmitted from the time synchronizing information transmission apparatus 71 is supplied directly to the data communication apparatus 1-1 to 1-6 without the intervention of the LAN-SW 2.

Figure 19:
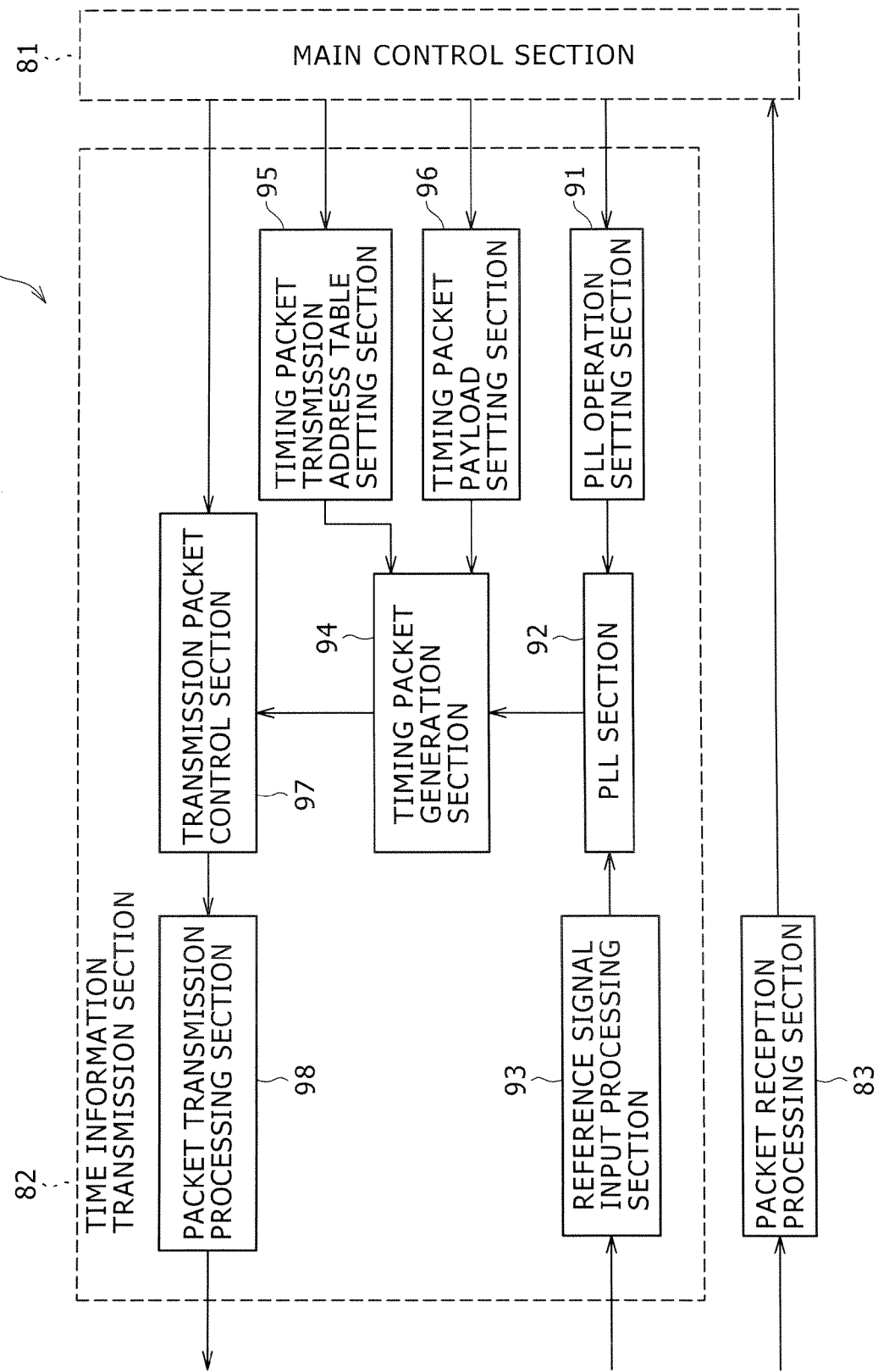
FIG. 19 is a block diagram showing an example of a functional configuration of a time synchronizing information transmission apparatus of the information processing system of FIG. 17 or 18.

The time synchronizing information transmission apparatus 71 has, for example, such a configuration as shown in FIG. 19. Referring to FIG. 19, the time synchronizing information transmission apparatus 71 shown includes a main control section 81, a time information transmission section 82, and a packet reception processing section 83. As can be recognized apparently from comparison between FIGS. 7 and 19, the main control section 81 shown in FIG. 19 corresponds to the main control section 11 shown in FIG. 7, and the time information transmission section 82 shown in FIG. 19 corresponds to the time information transmission section 12 shown in FIG. 7. Particularly, a PLL operation setting section 91, a PLL section 92, a reference signal input processing section 93, a timing packet generation section 94, a timing packet transmission address table setting section 95, a packet transmission processing section 96, a transmission packet control section 97, and a packet transmission processing section 98 of the time information transmission section 82 in FIG. 19 correspond to the PLL operation setting section 21, PLL section 22, reference signal input processing section 23, timing packet generation section 24, timing packet transmission address table setting section 25, timing packet payload setting section 26, transmission packet control section 27, and packet transmission processing section 28 of the time information transmission section 12 in FIG. 7, respectively. Further, the packet reception processing section 83 in FIG. 19 corresponds to the packet reception processing section 31 in FIG. 7.

Further, the embodiment of the present invention can be applied to such various information processing systems as described in (a) to (g) below.

(a) In the embodiments described hereinabove, the system includes a plurality of data communication apparatus having transmission and reception functions of transmitting and receiving both of a data packet whose real time performance should be assured and another data packet whose real time performance need not be assumed. However, the embodiment of the present invention can be applied also to an asynchronous network system which includes one or more information processing apparatus which transmit and receive only a data packet whose real time performance should be assured and one or more information processing apparatus which transmit and receive only a data packet whose real time performance need not be assured.

(b) In the embodiments described hereinabove, one or more image signal changeover apparatus and a changeover control apparatus for the image signal changeover apparatus are connected as image apparatus. However, some other image apparatus may be connected. For example, image pickup cameras, monitoring cameras, and other image pickup apparatus and a control apparatus for the cameras and image pickup apparatus may be connected. Further, for example, a video server, a video tape recorder, and other storage apparatus may be connected.

(c) In the embodiments described hereinabove, an image signal changeover system is described as an example of an asynchronous network system. Further, as an example of image processing apparatus which compose the asynchronous network system, image apparatus are described. However, the information processing apparatus which compose the asynchronous network system may include some other electronic apparatus. For example, the information processing apparatus may include a speaker, a tuner, an amplifier, a switcher, or other audio apparatus.

(d) The asynchronous network system can be applied not only to network systems for personal use but also to network systems for business use. For example, the asynchronous network system can be applied to broadcasting station systems (that is, to a case that broadcasting apparatus are connected as image apparatus) and home systems. Further, the asynchronous network system can be applied also to a trunk system which interconnects difference bases.

(e) The transmission and reception functions provided by the embodiments described above can be incorporated in information processing apparatus which can be used for applied systems. For example, the transmission and reception functions can be incorporated also in computers, printing apparatus, digital cameras, game machines, scanners, portable information terminals (portable computers, portable telephone sets, portable game machines, electronic books, and so forth), clocks and watches, image reproduction apparatus (for example, optical disk apparatus and home servers), monitors, and television receivers. It is to be noted that the transmission and reception functions can be incorporated not only in the form of a processing board, a semiconductor chip, or some other hardware but also in the form of a program which is executed on a computer.

(f) In the embodiments described hereinabove, a time synchronizing information data transmission apparatus and an information processing apparatus are separate from each other. However, the time synchronizing information data transmission apparatus may be incorporated in one of the information processing apparatus.

(g) The embodiments described hereinabove may be modified in various forms without departing from the spirit and scope of the present invention. Also various alterations and applications may be created based on the disclosure of the present invention.

Incidentally, while the series of processes described above or some of the processes can be executed by hardware, it may otherwise be executed by software.

Figure 20:
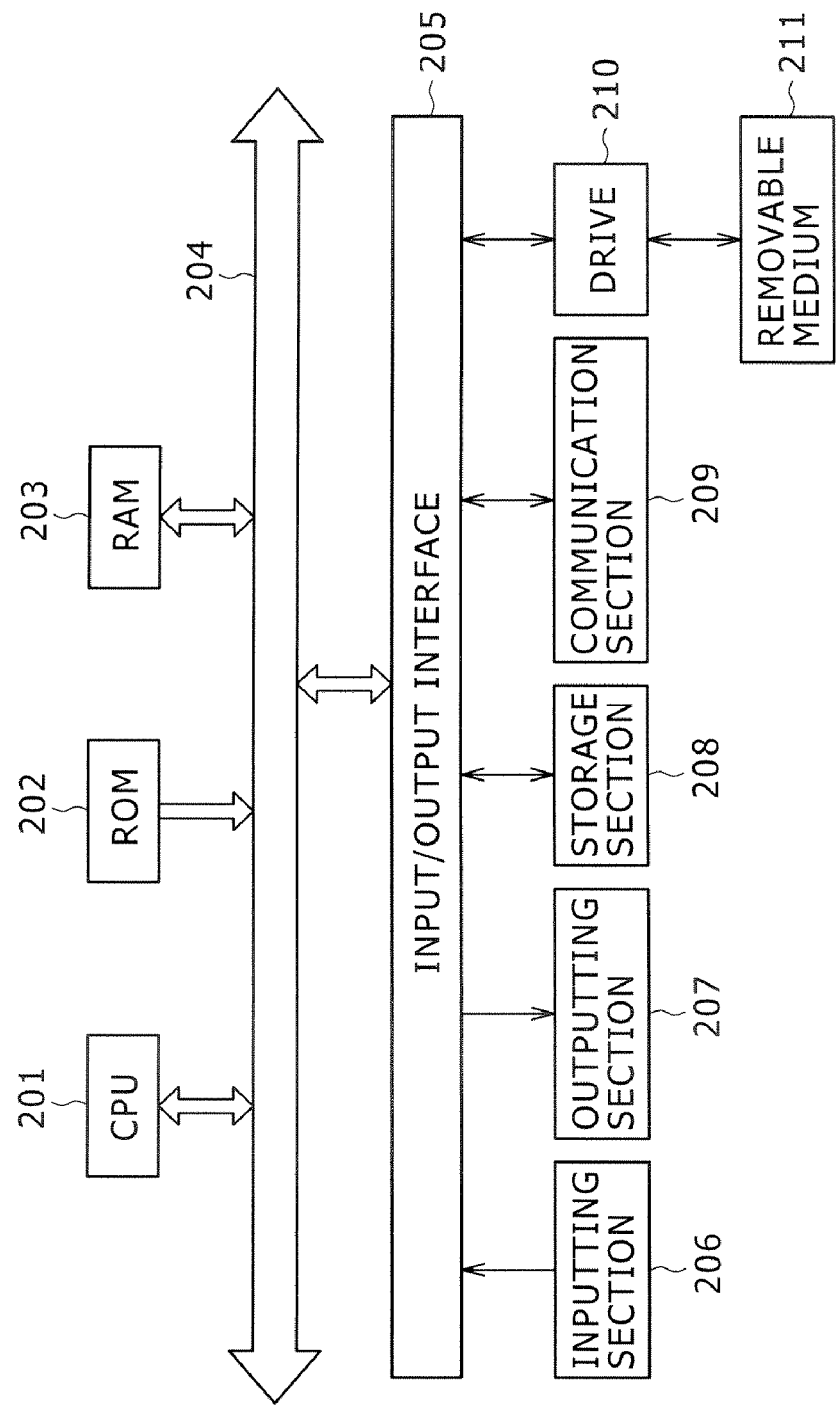
FIG. 20 is a block diagram showing an example of a hardware configuration of the entirety or part of an information processing apparatus according to an embodiment of the present invention.

In this instance, a component or components of the information processing systems described hereinabove, for example, all or some of the data communication apparatus 1-1 to 1-6 of FIG. 1 and so forth or the entirety or part of the time synchronizing information transmission apparatus 71 of FIG. 17 or the like, can be formed, for example, from such a computer as shown in FIG. 20.

Referring to FIG. 20, a central processing unit (CPU) 201 executes various processes in accordance with a program stored in a ROM (Read Only Memory) 202 or a program loaded from a storage section 208 into a RAM (Random Access Memory) 203. Also data necessary for the CPU 201 to execute the processes are suitably stored into the RAM 203.

The CPU 201, ROM 202, and RAM 203 are connected to one another by a bus 204. Also an input/output interface 205 is connected to the bus 204.

An inputting section 206 including a keyboard, a mouse, and so forth, an outputting section 207 including a display unit and so forth, a storage section 208 formed from a hard disk or the like, and a communication section 209 are connected to the input/output interface 205.

The communication section 209 transmits data supplied thereto from the CPU 201 through the LAN-SW 2 to other apparatus connected to the LAN-SW 2 (in the examples described hereinabove, the other data communication apparatus 1). Further, the communication section 209 receives data transmitted thereto from any other apparatus and supplies the received data to the CPU 201. The communication section 209 performs a predetermined process regarding a protocol stack such as, for example, the TCP/IP (Transmission Control Protocol/Internet Protocol).

Figure 21:
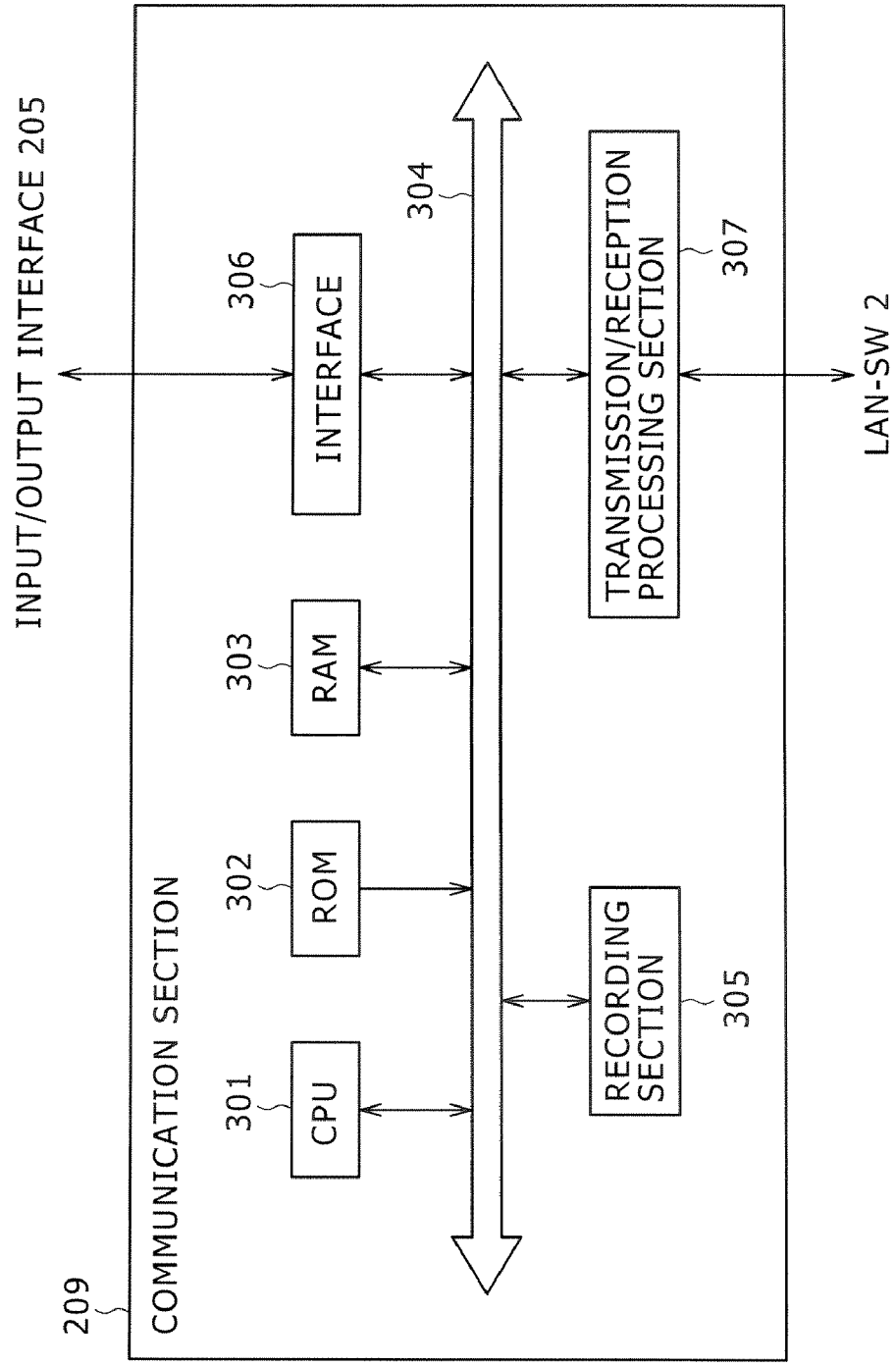
FIG. 21 is a block diagram showing an example of a detailed hardware configuration of a communication section of the information processing apparatus of FIG. 20.

Such a communication section 209 as described above can be configured, for example, in such a manner as seen in FIG. 21. In other words, FIG. 21 shows an example of a configuration of hardware of the communication section 209.

Referring to FIG. 21, the communication section 209 includes a CPU 301, a ROM 302, a RAM 303, a recording section 305, an interface 306, and a transmission/reception processing section 307. The CPU 301, ROM 302, RAM 303, recording section 305, interface 306, and transmission/reception processing section 307 are connected to each other by a bus 304.

In the communication section 209 of the example of FIG. 21, the CPU 301 executes various processes in accordance with a program stored in the ROM 302 or a program loaded from the recording section 305 into the RAM 203. Also data and so forth necessary for the CPU 301 to execute the processes are suitably stored into the RAM 203.

The transmission/reception processing section 307 performs, for example, a predetermined process for transmitting data to another apparatus or receiving data transmitted from another apparatus through the LAN-SW 2 under the control of the CPU 301.

Where the communication section 209 has such a hardware configuration as shown in FIG. 21, the functions of the time information transmission section 12 and the data transmission/reception section 13 described hereinabove with reference to FIG. 6 may be incorporated in the communication section 209. In particular, the CPU 301 of the communication section 209 may execute processes for implementing the functions of the time information transmission section 12 and the data transmission/reception section 13.

In this instance, although the communication section 209 may be regarded as a component of the data communication apparatus 1, it may otherwise be regarded as a single separate apparatus. In other words, for example, the communication section 209 shown in FIG. 21 may be formed as an apparatus removable from the data communication apparatus 1 shown in FIG. 20. In this instance, the communication section 209 can be mounted not only on the data communication apparatus 1 but also on various apparatus to execute such various processes as described hereinabove for performing network communication.

Referring back to FIG. 20, as occasion demands, a drive 210 is connected to the input/output interface 205. A non-transitory removable medium 211 such as a magnetic disk, an optical disk, a magneto-optical disk, a semiconductor memory, or the like is suitably loaded into the drive 210, and a computer program read from the loaded removable recording medium 211 is installed into the storage section 208 as occasion demands.

Where the series of processes is executed by software, a program which constructs the software is installed from a network or a recording medium into a computer incorporated in hardware for exclusive use or, for example, a personal computer for universal use which can execute various functions by installing various programs.

The recording medium including such a program as described above may be formed as a removable medium (package medium) 211 such as, as shown in FIG. 20, a magnetic disk (including a floppy disk), an optical disk (including a CD-ROM [Compact Disc-Read Only Memory] and a DVD [Digital Versatile Disk]), a magneto-optical disk (including an MD [Mini-Disc]), or a semiconductor memory which has the program recorded thereon or therein. The removable medium is distributed in order to provide the program to a user separately from an apparatus body. The recording medium may be formed also as the ROM 22 of FIG. 20, the ROM 302 of FIG. 21, the storage section 208 of FIG. 20, or a hard disk included in the recording section 305 of FIG. 21, which has the program recorded therein or thereon and is provided to a user in a form incorporated in an apparatus body.

It is to be noted that, in the present specification, the steps which describe the program recorded in or on a recording medium may be but need not necessarily be processed in a time series in the order as described, and include processes which are executed parallelly or individually without being processed in a time series.

Further, as described hereinabove, in the present specification, the term "system" is used to represent an entire apparatus composed of a plurality of devices or apparatus.

It should be understood by those skilled in the art that various modifications, combinations, sub-combinations and alternations may occur depending on design requirements and other factors insofar as they are within the scope of the appended claims or the equivalent thereof.

What is claimed is:

1. An information processing apparatus which is a component of an information processing system in which real time data, for which transmission and reception assurance, within a predetermined period of time after every fixed period, is necessary, is communicated through an asynchronous network, the information processing apparatus comprising:
   a generator configured to generate time synchronizing information packets, the time synchronizing information packets setting transmission and reception schedules of the real time data and having a first region containing a sequence number which varies after every period of time corresponding to the fixed period, and at least one of the time synchronizing information packets having a second region containing data corresponding to a configuration state of the asynchronous network, without all of the time synchronizing information packets having the second region containing data corresponding to the configuration state of the asynchronous network; and
   a transmission controller configured to control the time synchronizing information packets generated by said generator such that one time synchronizing information packet is transmitted to said asynchronous network at each transmission timing after the fixed period, the time synchronizing information packets being of a type distinct from other packets of the real time data being transmitted to said asynchronous network, and at least two of the time synchronizing information packets having different packet structures.

2. The information processing apparatus according to claim 1, wherein the data contained in the second region represents data for performing communication of shared information in said information processing system or divisional communication of the shared information.

3. The information processing apparatus according to claim 1, wherein the time synchronizing information packets are classified into a plurality of types and transmitted by broadcast communication;
   said information processing apparatus further comprising a setting unit configured to set one of a plurality of transmission source port numbers individually corresponding in a one-by-one corresponding relationship to the plural types of the time synchronizing information packets which correspond to the type of a transmission object;
   said generator generating the time synchronizing information packets which further include the transmission source port number set by said setting unit and are of the type corresponding to the transmission source port number set by said setting unit.

4. The information processing apparatus according to claim 1, wherein the time synchronizing information packets are classified into a plurality of types and transmitted by multicast communication;
   said information processing apparatus further comprising a setting unit configured to set an Internet Protocol multicast address corresponding to the type of a transmission object from among a plurality of Internet Protocol multicast addresses corresponding in a one-by-one corresponding relationship to the plural types of the time synchronizing information packets;
   said generator generating the time synchronizing information packets which further include the Internet Protocol multicast address set by said setting unit and are of the type which correspond to the Internet Protocol multicast address set by said setting unit.

5. The information processing apparatus according to claim 1, wherein said asynchronous network is divided into a plurality of virtual local area networks;
   the time synchronizing information packets being classified into a plurality of types, the time synchronizing information packets being transmitted by broadcast communication through one of said virtual local area networks to which said information processing apparatus belongs;
   said information processing apparatus further comprising a setting unit configured to set a virtual local area network identifier corresponding to the type of a transmission object from among a plurality of virtual local area network identifiers which individually correspond in a one-by-one corresponding relationship to the plural types of the time synchronizing information packets;
   said generator generating the time synchronizing information packets which further include the virtual local area network identifiers set by said setting unit and are of the type which correspond to the virtual local area network identifier set by said setting unit.

6. The information processing apparatus according to claim 1, wherein the different packet structures include different User Datagram Protocol payload data.

7. The information processing apparatus according to claim 1, further comprising:
   a reference signal input processing section configured to receive a reference signal from outside of the information processing apparatus, wherein
   the generator is configured to generate at least one of the time synchronizing information packets based on the reference signal.

8. The information processing apparatus according to claim 1, wherein the transmission and reception schedules of the real time data is shared among other information processing apparatuses.

9. An information processing method for an information processing apparatus which is a component of an information processing system in which real time data, for which transmission and reception assurance, within a predetermined period of time after every fixed period, is necessary, is communicated through an asynchronous network, the information processing method comprising:

generating time synchronizing information packets, the time synchronizing information packets setting transmission and reception schedules of the real time data and having a first region containing a sequence number which varies after every period of time corresponding to the fixed period, and at least one of the time synchronizing information packets having a second region containing data corresponding to a configuration state of the asynchronous network, without all of the time synchronizing information packets having the second region containing data corresponding to the configuration state of the asynchronous network; and transmitting the generated time synchronizing information packets such that one packet is transmitted to said asynchronous network at each transmission timing after the fixed period, the time synchronizing information packets being of a type distinct from other packets of the real time data being transmitted to said asynchronous network, and at least two of the time synchronizing information packets having different packet structures.

10. A non-transitory computer-readable storage medium including stored thereon computer executable instructions, wherein the instructions, when executed by a computer, cause the computer to perform a method in which real time data for which transmission and reception assurance, within a predetermined period of time after every fixed period, is necessary, is communicated through an asynchronous network, the method comprising:

generating time synchronizing information packets, the time synchronizing information packets setting transmission and reception schedules of the real time data and having a first region containing a sequence number which varies after every period of time corresponding to the fixed period, and at least one of the time synchronizing information packets having a second region containing data corresponding to a configuration state of the asynchronous network, without all of the time synchronizing information packets having the second region containing data corresponding to the configuration state of the asynchronous network; and transmitting the generated time synchronizing information packets to the asynchronous network such that one packet is transmitted at each transmission timing after the fixed period, the time synchronizing information packets being of a type distinct from other packets of the real time data being transmitted to said asynchronous network, and at least two of the time synchronizing information packets having different packet structures.

11. An information processing apparatus which is a component of an information processing system in which real time data, for which transmission and reception assurance, within a predetermined period of time after every fixed period, is necessary, is communicated through an asynchronous network, the information processing apparatus comprising:

a receiving unit configured to receive packets when the received packets, having a first region containing a sequence number which varies after every period of time corresponding to the fixed period, and at least one of the received packets having a second region containing data corresponding to a configuration state of the asynchronous network, without all of the received packets having the second region containing data corresponding to the configuration state of the asynchronous network, are transmitted as time synchronizing information packets, the time synchronizing information packets setting transmission and reception schedules of the real time data, from a different information processing apparatus to said information processing apparatus through said asynchronous network at each transmission timing after the fixed period, the time synchronizing information packets being of a type distinct from other received packets of the real time data being received through said asynchronous network, and at least two of the time synchronizing information packets having different packet structures;

a determining unit configured to decide whether or not the received packets received by said receiving unit are time synchronizing information packets; and a detecting unit configured to detect the sequence number from those of the received packets received by said receiving unit which are decided as the time synchronizing information packets by said determining unit.

12. The information processing apparatus according to claim 11, wherein the data contained in the second region represents data for performing communication of shared information in said information processing system or divisional communication of the shared information, said detecting unit further detecting the data from those received packets which are decided as the time synchronizing information packets by said determining unit.

13. The information processing apparatus according to claim 11, wherein the time synchronizing information packets are classified into a plurality of types and transmitted by broadcast communication and further include one of a plurality of transmission source port numbers individually corresponding in a one-by-one corresponding relationship to the plural types of the time synchronizing information packets which correspond to the type of a transmission object to the different information processing apparatus;

said determining unit deciding whether or not the received packets are time synchronizing information packets of the type of a reception object based on a transmission source port number included in the received packets received by said receiving unit.

14. The information processing apparatus according to claim 11, wherein the time synchronizing information packets are classified into a plurality of types and transmitted by multicast communication;

each of the time synchronizing information packets further including an Internet Protocol multicast address corresponding to the type of a transmission object to the different information processing apparatus from among a plurality of Internet Protocol multicast addresses which correspond in a one-by-one corresponding relationship to the plural types of the time synchronizing information packets;

said determining unit deciding whether or not the received packets are time synchronizing information packets of the type of a reception object based on an IP multicast address included in the received packets received by said receiving unit.

15. The information processing apparatus according to claim 11, wherein
said asynchronous network is divided into a plurality of virtual local area networks,
the time synchronizing information packets being classified into a plurality of types, the time synchronizing information packets being transmitted by broadcast communication through one of said virtual local area networks to which the different information processing apparatus and said information processing apparatus belong,
each of the time synchronizing information packets further including a virtual local area network identifier corresponding to the type of a transmission object to the different information processing apparatus from among a plurality of virtual local area network identifiers which correspond in a one-by-one corresponding relationship to the plural types of the time synchronizing information packets, and
said determining unit deciding whether or not the received packets are time synchronizing information packets of the type of a reception object based on a virtual local area network identifier included in the received packets received by said receiving unit.

16. An information processing method for an information processing apparatus which is a component of an information processing system in which real time data, for which transmission and reception assurance, within a predetermined period of time after every fixed period, is necessary, is communicated through an asynchronous network, the information processing method comprising:
receiving packets when the received packets, having a first region containing a sequence number which varies after every period of time corresponding to the fixed period, and at least one of the received packets having a second region containing data corresponding to a configuration state of the asynchronous network, without all of the received packets having the second region containing data corresponding to the configuration state of the asynchronous network, are transmitted as time synchronizing information packets, the time synchronizing information packets setting transmission and reception schedules of the real time data, from a different information processing apparatus to said information processing apparatus through said asynchronous network at each transmission timing after the fixed period, the time synchronizing information packets being of a type distinct from other received packets of the real time data being received through said asynchronous network, and at least two of the time synchronizing information packets having different packet structures;
deciding whether or not the received packets are time synchronizing information packets; and
detecting the sequence number from those of the received packets which are decided as the time synchronizing information packets.

17. A non-transitory computer-readable storage medium including stored thereon computer executable instructions, wherein the instructions, when executed by a computer, cause the computer to perform a method in which real time data for which transmission and reception assurance, within a predetermined period of time after every fixed period, is necessary, is communicated through an asynchronous network, the method comprising:
receiving packets when the received packets, having a first region containing a sequence number which varies after every period of time corresponding to the fixed period, and at least one of the received packets having a second region containing data corresponding to a configuration state of the asynchronous network, without all of the received packets having the second region containing data corresponding to the configuration state of the asynchronous network, are transmitted as time synchronizing information packets, the time synchronizing information packets setting transmission and reception schedules of the real time data, from a first information processing apparatus to a second information processing apparatus through said asynchronous network at each transmission timing after the fixed period, the time synchronizing information packets being of a type distinct from other received packets of the real time data being received through said asynchronous network, and at least two of the time synchronizing information packets having different packet structures;
deciding whether or not the received packets are time synchronizing information packets; and
detecting the sequence number from those of the received packets which are decided as the time synchronizing information packets.

* * * * *